US008251051B2

(12) United States Patent
Maggiore

(10) Patent No.: US 8,251,051 B2
(45) Date of Patent: Aug. 28, 2012

(54) BUG KILLING GUN

(76) Inventor: Loren Maggiore, Santa Monica, CA (US)

( * ) Notice: Subject to any disclaimer, the term of this patent is extended or adjusted under 35 U.S.C. 154(b) by 392 days.

(21) Appl. No.: 12/723,355

(22) Filed: Mar. 12, 2010

(65) Prior Publication Data
US 2011/0220088 A1 Sep. 15, 2011

(51) Int. Cl.
*F41B 11/02* (2006.01)
*F41B 11/06* (2006.01)
*A01M 27/00* (2006.01)
*A01M 5/02* (2006.01)

(52) U.S. Cl. ............ 124/76; 124/40; 124/45; 43/141

(58) Field of Classification Search ............ 124/40, 124/45, 63, 65, 69, 76; 43/141
See application file for complete search history.

(56) References Cited

U.S. PATENT DOCUMENTS

| | | | |
|---|---|---|---|
| 1,611,533 A | 12/1926 | Kirsten | |
| 3,308,571 A | 3/1967 | Jones | |
| 3,672,301 A | 6/1972 | Abbott | |
| 3,704,981 A | 12/1972 | Pohr | |
| 3,791,303 A | 2/1974 | Sweeney et al. | |
| 4,653,433 A | 3/1987 | Comparetti | |
| 5,460,154 A * | 10/1995 | Mattern et al. ............ | 124/56 |
| 5,515,838 A * | 5/1996 | Anderson .................. | 124/76 |
| 5,722,383 A * | 3/1998 | Tippmann et al. .......... | 124/76 |
| 5,743,246 A * | 4/1998 | Mattern .................... | 124/56 |
| 5,785,038 A * | 7/1998 | Mattern .................... | 124/56 |
| 6,220,237 B1 * | 4/2001 | Johnson et al. ............ | 124/73 |
| 6,247,995 B1 * | 6/2001 | Bryan ....................... | 446/473 |
| 6,393,992 B1 | 5/2002 | Vasel et al. | |
| 6,772,694 B1 | 8/2004 | Pearce, III et al. | |
| 7,185,645 B1 * | 3/2007 | Neumeir et al. ............ | 124/71 |
| 7,207,497 B2 | 4/2007 | Clark | |
| 7,287,527 B1 * | 10/2007 | Piper ........................ | 124/72 |
| 2002/0179075 A1 | 12/2002 | Robinson, Jr. et al. | |
| 2004/0149275 A1 * | 8/2004 | Vincent ..................... | 124/41.1 |
| 2006/0070610 A1 * | 4/2006 | Reeves ...................... | 124/72 |
| 2006/0254570 A1 * | 11/2006 | Dillon ....................... | 124/69 |
| 2006/0283433 A1 | 12/2006 | Gerardo | |
| 2009/0255434 A1 | 10/2009 | Pawloski | |
| 2010/0275895 A1 * | 11/2010 | Wenaas et al. ............. | 124/74 |

* cited by examiner

*Primary Examiner* — Bret Hayes
(74) *Attorney, Agent, or Firm* — David A. Belasco; Belasco Jacobs & Townsley, LLP

(57) ABSTRACT

A bug killing gun includes a compressed gas source fluidly connected to a chamber connected to a barrel. A compressed gas release mechanism is connected to the compressed gas source. A projectile storage magazine stores particulate projectiles and is located adjacent the chamber. A projectile loading mechanism moves the projectiles into the chamber from the magazine. A cocking mechanism is mechanically connected to the compressed gas source, the compressed gas release mechanism, and the projectile loading mechanism. A stock houses and supports the compressed gas source, the compressed gas release mechanism, the barrel, the chamber, the projectile storage magazine, the cocking mechanism and the projectile loading mechanism. When the gun is cocked, the projectile loading mechanism loads a predetermined quantity of the particulate projectiles into the chamber. When the compressed gas release mechanism is activated the projectiles are ejected from the chamber into the barrel and expelled from the gun.

22 Claims, 16 Drawing Sheets

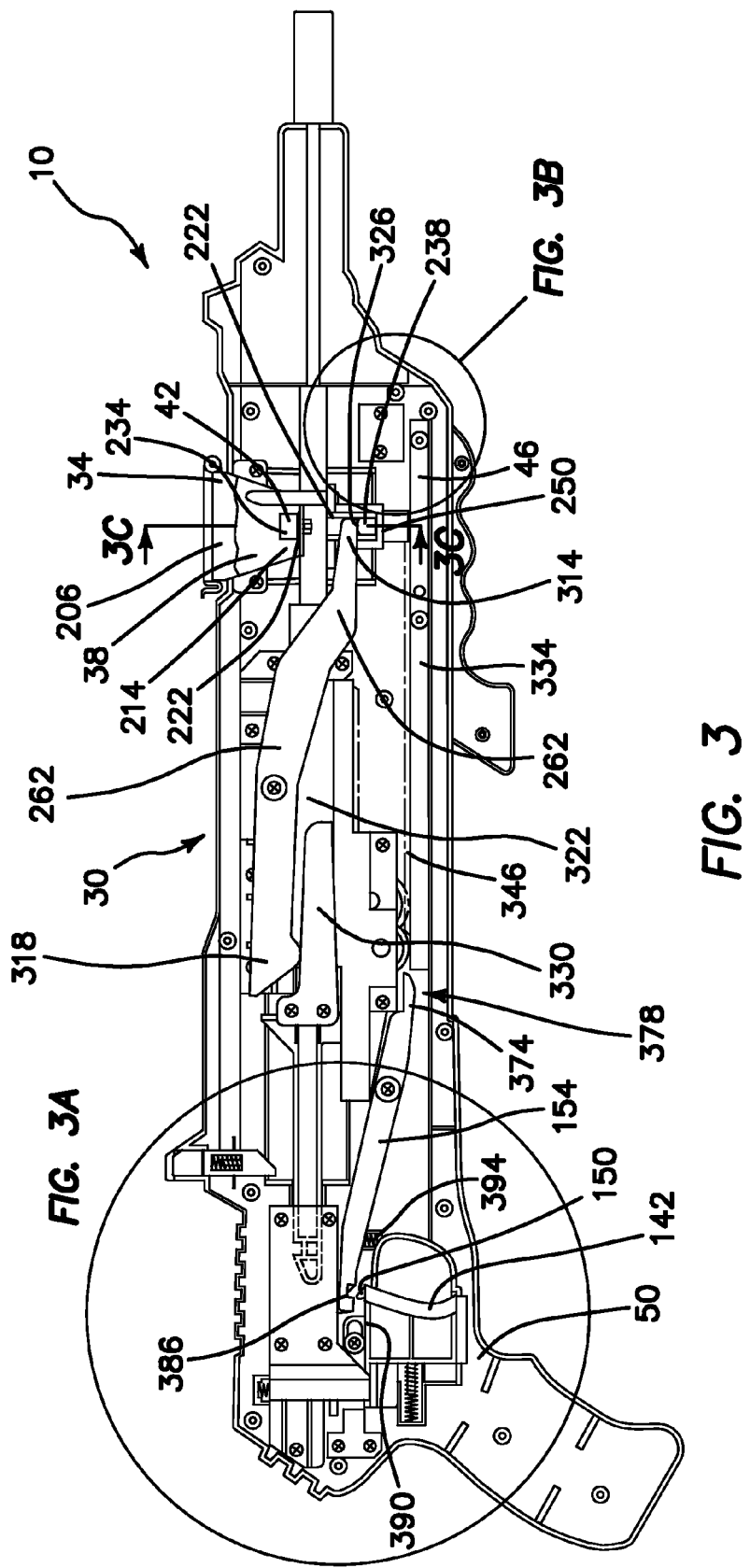

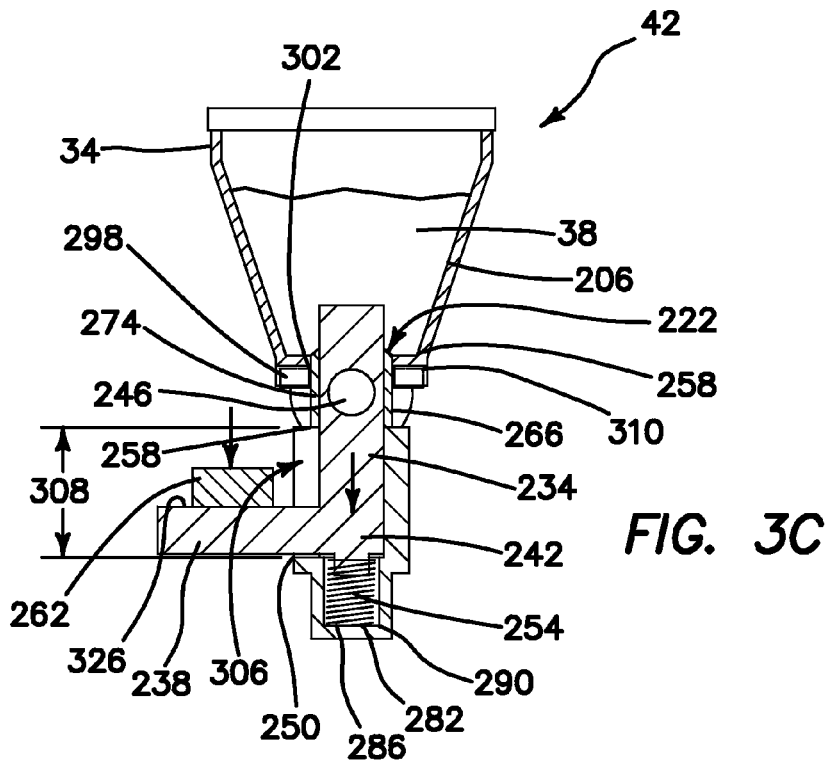
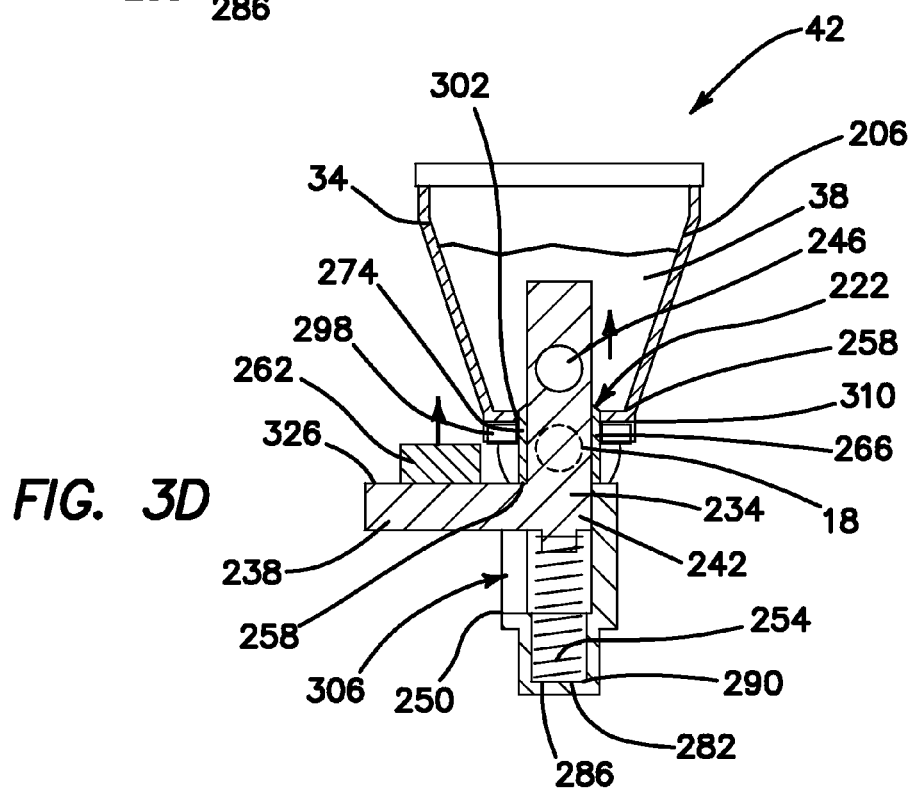

BUG KILLING GUN

FIELD OF INVENTION

This invention relates to the fields of weaponry and insect control, and more specifically to a device for killing insects at a distance without use of toxic chemicals.

BACKGROUND OF THE INVENTION

Many methods and devices have been developed for dealing with insect pests. Many people are particularly interested in dealing with flying insects as they tend to be very visible, sometimes noisy and often possessing the capability to bite or sting. Traditional means for killing flying insects include devices such as fly swatters and their equivalent or chemical sprays. The former requires a certain skill and agility to be effective and the latter leaves a potentially harmful chemical residue in the area where used. The present invention addresses these concerns and also provides entertainment to those tasked with removal of insect pests in the form of a gun designed for shooting flying insects. Other devices developed to provide insect removal in a related fashion include the following inventions.

U.S. Pat. No. 1,611,533, issued to Kirsten, is directed to an insect shooting apparatus wherein a spring-loaded pistol-type device is used to dispense a shot or bead of material in order to exterminate various household insects such as flies. The device takes the form of a gun or pistol with a piston that is operated through a linkage mechanism and released under spring actuation by means of trigger. The movement of piston in a forward direction ultimately causes release of a shot holding a nozzle from a tapered end of the barrel. A shot holding nozzle contains a liquid which when dispersed upon an insect such as a fly and exterminates same.

U.S. Pat. No. 4,653,433, issued to Comparetti is directed to a flea zapper which takes the form of a pistol and when activated by a triggered mechanism releases a powder material for controlling insects such as fleas normally found on furry animals. The flea zapper takes the form of a handgun with a pistol-type handle with a trigger to be operated by the finger of the user. When the trigger is operated, a sample of powder is released from the powder chamber through the barrel portion through an opening and dispensed onto the animal.

U.S. Patent No. Sweeny et al., issued to Sweeny et al. is directed to deterrent ammunition which takes the form of a liquid-filled hollow ball. The projectile assembly is fired from an oversized tubular barrel extension on the end of a shotgun. The projectile assembly contains deterrent ammunition which upon rupture may control flies or other insects.

U.S. Patent Application No. 2006/0283433, published for Gerardo is directed to a projection apparatus using pressurized air. The device comprises a gun-like device, an air chamber with a trigger with a valve inside of connector that connects the air chamber to the barrel. The air chamber can be filled with compressed air and after loading the gun with an object to be fired from barrel the operator then opens the valve to allow the air pressure out of chamber releasing the air from the chamber under operation of trigger and the projectile is released from the barrel.

U.S. Pat. No. 7,207,497, issued to Clark is directed to a dry flake sprayer and method which is used to spray dry flakes utilizing a pressurized gas source. The flake spraying device includes a spray module and a gun module wherein the spray module comprises an enclosure with a gas flow conduit and a flake conduit. A supply of dry flakes is placed into the enclosure and connected to gun and when the trigger is operated. Gas flows from the control valve through nozzle which causes the flakes to be dispersed through conduit.

It is an objective of the present invention to provide a device for killing flying insects. It is a further objective to provide such a device that uses non-toxic means for killing the insects. It is a still further objective of the invention to provide an insect killing device that incorporates positive safety features. It is yet a further objective to provide such a device that is entertaining to use and inexpensive to operate. Finally, it is an objective of the present invention to provide an insect killing device that is durable, inexpensive and simple for the user to master.

While some of the objectives of the present invention are disclosed in the prior art, none of the inventions found include all of the requirements identified.

SUMMARY OF THE INVENTION

The present invention addresses all of the deficiencies of prior art bug killing gun inventions and satisfies all of the objectives described above.

(1) A bug killing gun providing the desired features may be constructed from the following components. A compressed gas source is provided. A chamber is provided. The chamber is fluidly connected to the compressed gas source. A barrel is provided. The barrel is located at a distal end of the chamber. A compressed gas release mechanism is provided. The release mechanism is connected to the compressed gas source. A projectile storage magazine is provided. The magazine stores particulate projectiles and is located adjacent the chamber. A projectile loading mechanism is provided. The loading mechanism moves the particulate projectiles into the chamber from the magazine. A cocking mechanism is mechanically connected to the compressed gas source, the compressed gas release mechanism, and the projectile loading mechanism. A stock is provided. The stock houses and supports the compressed gas source, the compressed gas release mechanism, the barrel, the chamber, the projectile storage magazine, the cocking mechanism and the projectile loading mechanism. When the gun is cocked by the cocking mechanism, the projectile loading mechanism gathers a predetermined quantity of the particulate projectiles and positions the projectiles in the chamber. When the compressed gas release mechanism is activated the projectiles are ejected from the chamber into the barrel and expelled from the gun.

(2) In a variant of the invention, the bug killing gun further includes a safety mechanism. The safety mechanism is moved from a firing permitting position to a firing preventing position by the gun cocking action. The firing preventing position prevents activation of the compressed gas release mechanism and is indicated to a user by automatic movement of a primary external safety lever to a first, safe position. The firing permitting position permits activation of the compressed gas release mechanism and is indicated to the user by manual movement by the user of the external safety lever to a second, firing position.

(3) In another variant, a secondary safety indicator is provided. The secondary safety indicator is moved from a hidden position to a visible position by the gun cocking action and is moved to the hidden position by activation of the compressed gas release mechanism.

(4) In still another variant, the compressed gas source is selected from the group that includes a prefilled $CO_2$ cartridge, a refillable compressed gas cylinder, a pneumatically pumped gas reservoir, a spring-activated compressed gas chamber and an external compressed gas line.

(5) In yet another variant, the spring-activated compressed gas chamber further includes a cylinder. The cylinder has a front end and a rear end and is fluidly connected to the chamber at the front end. A piston is provided. The piston fits sealably in the cylinder and is located within it. A compression spring is provided. The compression spring urges the piston toward the front end. A spring compression mechanism is provided. The compression mechanism urges the piston towards the rear end and compresses the compression spring. A latching mechanism is provided. The latching mechanism releasably retains the piston adjacent the rear end and retains the compression spring in a compressed state. A user performs the gun cocking action, the spring compression mechanism is operated, the piston is urged toward the rear end of the cylinder, the spring is compressed and the spring and the piston are retained by the latching mechanism until released, allowing the piston to move rapidly toward the front end of the cylinder. This provides a burst of compressed gas in the cylinder and to the connected chamber.

(6) In a further variant, the compressed gas release mechanism further includes a trigger. The trigger is urged forward by a trigger return spring. The trigger has an upper notch. The upper notch engages an internal safety pivot. The safety pivot prevents release of the latching mechanism unless the cocking action is completed. The trigger has an elevating ramp located rewardly of the upper notch. The elevating ramp urges a releasing bracket of the latching mechanism upwardly against a downwardly urging compression spring as the trigger is moved rearwardly. The releasing bracket moves slidably within a vertical channel in the supporting stock and has a downwardly facing rib. The rib releasably engages an upwardly facing control notch in a main pole of the latching mechanism.

The main pole is attached to the piston, has an upwardly angled ramp at a rear end, located behind the control notch. The ramp guides the rib into the control notch. The main pole moves rearwardly in a channel in the supporting stock during the cocking action. The releasing bracket retains the main pole in a first, cocked position as the rib engages the control notch. The bracket releases the main pole to a second, fired position as the trigger is moved rearwardly, elevating the releasing bracket and raising the rib from the control notch. This allows the main pole and the piston to move forward as urged by the compression spring, pressurizing the cylinder.

(7) In still a further variant, the projectile storage magazine further includes an upward facing conical container. The container has a circular opening at a lower end. The lower end is fitted sealably to an upper end of a vertical circular opening through the chamber. The container has a sealing lid removably attached at an upper end.

(8) In yet a further variant, the projectile loading mechanism further includes a metering rod. The metering rod is sized and shaped to fit sealably through the vertical circular opening through the chamber and has an orthogonal activation bar extending from its lower end and a through hole located above the activation bar. The through hole is orthogonal to the bar and sized and located to align with the chamber when the bar is positioned against a stopping surface. The activation bar is urged upwardly by a return compression spring to rest against the lower end of the vertical circular opening in the chamber.

The through hole fills with the particulate projectiles when located above the chamber in the conical container during the cocking action. The activation bar is urged downwardly by a pivotally mounted subordination pole to rest against the stopping surface just after activation of the compressed gas release mechanism. This permits the compressed gas to eject the particulate projectiles from the chamber and through the barrel.

(9) In another variant of the invention, the projectile loading mechanism further includes a mid-chamber pipe. The pipe extends downwardly from a lower end of the magazine. A lower portion of the pipe provides a stop for one end of a return compression spring. A trajectory guide is provided. The guide is located below the lower end of the magazine, has a hollow bore sized to fit slidably about the pipe and has a vertical slot that extends downwardly from the lower end for a first predetermined distance. The slot terminates in a stopping surface. The trajectory guide is located about the pipe and provides a support platform for attachment of the projectile storage magazine. A metering rod is provided. The rod is cylindrical in shape and is sized to fit slidably within the pipe and has an orthogonal activation bar extending from its lower end. The metering rod has a through hole located above the activation bar. The through hole is orthogonal to the bar and sized and located to align with the chamber when the bar is positioned against the stopping surface. The return compression spring urges the metering rod upwardly to rest against the lower end of the vertical circular opening in the chamber. A subordination pole is provided. The pole has a first end and a second end and is pivotally mounted to a cover for the compressed gas source. The first end of the subordination pole bears against an upper surface of the activation bar. The second end of the subordination pole is urged upwardly by a cam upon activation of the gas release mechanism. Upward movement of the second end of the subordination pole moves the activation bar downwardly, compresses the return compression spring and aligns the through hole of the metering rod with the chamber. This permits the compressed gas to drive the particulate projectiles out of the chamber and through the barrel. Downward movement of the second end of the subordination pole permits the activation bar to move upwardly as urged by the return compression spring. This allows the particulate projectiles to fill the through hole of the metering rod as it rises in the projectile storage magazine surrounded by the particulate projectiles.

(10) In still another variant, the spring compression mechanism further includes a primary gear rack. The gear rack is slidably located in a channel in the supporting stock, has gear teeth located upon an upper surface and has mounting fixtures adjacent a forward end for attachment of a slide handle. A reduction gear drive is provided. The gear drive is mounted to an outer cover of the cylinder. A secondary gear rack is provided. The secondary rack is attached indirectly to the piston and is located slidably in a slot in the outer cover above the reduction gear drive. The primary gear rack engages the reduction gear drive and the reduction gear drive engaging the secondary gear rack. Rearward movement of the slide handle moves the primary gear rack rearward, rotates the reduction gear drive, moves the secondary gear rack rearward and moves the piston rearward, compressing the compression spring.

(11) In yet another variant, the upper surface of the primary gear rack maintains a first end of an internal safety pivot in an elevated position during rearward movement. This causes a second end of the pivot, which has a downward facing notch, to engage an upper notch at an upper end of a trigger of the compressed gas release mechanism, thereby preventing activation of the mechanism. The upper surface permits downward movement of the internal safety pivot, as urged by a coil spring, upon completion of forward movement of the primary gear rack. The downward movement permits release of the downward facing notch from the trigger and permits activation of the gas release mechanism.

(12) In a further variant, completion of forward movement of the primary gear rack is indicated to a user by an auditory indicator. The indicator includes a spring-driven pin and a receiving detent. The detent is located at a distal end of a side surface of the primary gear rack and the spring-driven pin is located on an interior surface of the support stock adjacent the primary gear rack. The spring-driven pin enters the detent upon completion of forward movement of the primary gear rack providing an auditory signal to the user.

(13) In still a further variant, the support stock further includes a sight glass. The sight glass is positioned adjacent the magazine and permits a view of a level of the particulate projectiles contained in the magazine.

(14) In yet a further variant, the gun uses a prefilled $CO_2$ cartridge as a compressed gas source and the gun further includes a cylindrical cartridge chamber. The cartridge chamber is sized and shaped to enclose a $CO_2$ cartridge and has a sealable opening at a first end for introduction of the cartridge. A concave seat located at a second end is provided. The seat is sized and shaped to fit sealably about a discharging end of the cartridge. A hollow puncturing needle is located within the seat. A sealing cap is provided. The cap is removably attached to the cartridge chamber by mating screw threads. Tightening of the cap urges the cartridge against the puncturing needle. A pressure vessel is provided. The pressure vessel is fluidly connected to a metering device. The metering device permits a predetermined charge of compressed gas to enter the chamber upon activation of the compressed gas release mechanism.

(15) In still a further variant, the compressed gas release mechanism further includes a trigger. The trigger is urged forward by a trigger return spring. The trigger has an upper notch. The upper notch engages an internal safety pivot. The safety pivot prevents activation of the compressed gas release mechanism unless the cocking action is completed. The trigger has an elevating ramp located rewardly of the upper notch. The elevating ramp urges a releasing bracket of the latching mechanism upwardly against a downwardly urging compression spring as the trigger is moved rearwardly. The releasing bracket moves slidably within a vertical channel in the supporting stock and has a downwardly facing rib. The rib releasably engages an upwardly facing control notch in a loading rod. The loading rod is urged forward by a loading coil spring, has an upwardly angled ramp at a rear end, located behind the control notch. The ramp guides the rib into the control notch.

The loading rod moves rearwardly in a channel in the supporting stock during the cocking action. The releasing bracket retains the loading rod in a first, cocked position as the rib engages the control notch. The releasing bracket releases the loading rod to a second, fired position as the trigger is moved rearwardly, elevating the releasing bracket and raising the rib from the control notch. This allows the loading rod to move forward as urged by the loading coil spring. The loading rod activates the projectile loading mechanism and the metering device.

(16) In another variant of the invention, the gun uses a pneumatically pumped air reservoir as a compressed gas source and the gun further includes a gas cylinder. The cylinder has an inlet valve and an outlet valve. A piston is provided. The piston fits sealably within the cylinder. A pumping mechanism is provided. The pumping mechanism is mechanically linked to the piston and moves the piston from an extended position to a compressed position within the cylinder. The inlet valve is in an open position as the piston moves from the compressed position to the extended position and is in a closed position as the piston moves from the extended position to the compressed position. The outlet valve is in a closed position as the piston moves from the compressed position to the extended position and is in an open position as the piston moves from the extended position to the compressed position.

The air reservoir is fluidly connected to the outlet valve and the chamber. The projectile loading mechanism permits a predetermined charge of compressed gas to enter the chamber upon activation of the compressed gas release mechanism. Repeated movement of the piston by the pumping mechanism from the extended position to the compressed position within the cylinder will increase pressure within the air reservoir, permitting the particulate projectiles to be ejected from the chamber with increased force upon release of the pressure by the compressed gas release mechanism.

(17) In still another variant, the compressed gas release mechanism further includes a trigger. The trigger is urged forward by a trigger return spring. The trigger has an upper notch. The upper notch engages an internal safety pivot. The safety pivot prevents activation of the compressed gas release mechanism unless the cocking action is completed. The trigger has an elevating ramp located rewardly of the upper notch. The elevating ramp urges a releasing bracket of the latching mechanism upwardly against a downwardly urging compression spring as the trigger is moved rearwardly. The releasing bracket moves slidably within a vertical channel in the supporting stock and has a downwardly facing rib. The rib releasably engages an upwardly facing control notch in a loading rod. The loading rod is urged forward by a loading coil spring, has an upwardly angled ramp at a rear end, located behind the control notch. The ramp guides the rib into the control notch.

The loading rod moves rearwardly in a channel in the supporting stock during the cocking action. The releasing bracket retains the loading rod in a first, cocked position as the rib engages the control notch. The releasing bracket releases the loading rod to a second, fired position as the trigger is moved rearwardly, elevating the releasing bracket and raising the rib from the control notch. This allows the loading rod to move forward as urged by the loading coil spring. The loading rod activates the projectile loading mechanism.

(18) In yet another variant, the gun uses a refillable compressed gas cylinder as a compressed gas source. The cylinder has a shut off valve and an attachment fitting located adjacent a first end. A mating attachment fitting is provided. The mating fitting is mounted to the support stock and is fluidly connected to a metering device. The metering device is fluidly connected to the chamber and the metering device permits a predetermined charge of compressed gas to enter the chamber upon activation of the compressed gas release mechanism. A charged refillable compressed gas cylinder is attached to the mating attachment fitting, the shut off valve is opened and the compressed gas is released by the metering device upon activation of the compressed gas release mechanism.

(19) In a further variant, the compressed gas release mechanism further includes a trigger. The trigger is urged forward by a trigger return spring. The trigger has an upper notch. The upper notch engages an internal safety pivot. The safety pivot prevents activation of the compressed gas release mechanism unless the cocking action is completed. The trigger has an elevating ramp located rewardly of the upper notch. The elevating ramp urges a releasing bracket of the latching mechanism upwardly against a downwardly urging compression spring as the trigger is moved rearwardly. The releasing bracket moves slidably within a vertical channel in the supporting stock and has a downwardly facing rib. The rib releasably engages an upwardly facing control notch in a loading rod. The loading rod is urged forward by a loading coil spring, has an upwardly angled ramp at a rear end, located behind the control notch. The ramp guides the rib into the control notch.

The loading rod moves rearwardly in a channel in the supporting stock during the cocking action. The releasing bracket retains the loading rod in a first, cocked position as the rib engages the control notch. The releasing bracket releases the loading rod to a second, fired position as the trigger is moved rearwardly, elevating the releasing bracket and raising the rib from the control notch. This allows the loading rod to move forward as urged by the loading coil spring. The loading rod activates the projectile loading mechanism and the metering device.

(20) In yet a further variant, the gun uses an external compressed gas line as a compressed gas source and the gun further includes an external compressed gas line. The line is connected to a compressed gas source and has a shut off valve and an attachment fitting located adjacent a first end. A mating attachment fitting is provided. The mating fitting is mounted to the support stock and is fluidly connected to a metering device. The metering device is fluidly connected to the chamber. The metering device permits a predetermined charge of compressed gas to enter the chamber upon activation of the compressed gas release mechanism. The external compressed gas line is attached to the mating attachment fitting, the shut off valve is opened and the compressed gas is released by the metering device upon activation of the compressed gas release mechanism.

(21) In still a further variant, the compressed gas release mechanism further includes a trigger. The trigger is urged forward by a trigger return spring. The trigger has an upper notch. The upper notch engages an internal safety pivot. The safety pivot prevents activation of the compressed gas release mechanism unless the cocking action is completed. The trigger has an elevating ramp located rewardly of the upper notch. The elevating ramp urges a releasing bracket of the latching mechanism upwardly against a downwardly urging compression spring as the trigger is moved rearwardly. The releasing bracket moves slidably within a vertical channel in the supporting stock and has a downwardly facing rib. The rib releasably engages an upwardly facing control notch in a loading rod. The loading rod is urged forward by a loading coil spring, has an upwardly angled ramp at a rear end, located behind the control notch. The ramp guides the rib into the control notch.

The loading rod moves rearwardly in a channel in the supporting stock during the cocking action. The releasing bracket retains the loading rod in a first, cocked position as the rib engages the control notch. The releasing bracket releases the loading rod to a second, fired position as the trigger is moved rearwardly, elevating the releasing bracket and raising the rib from the control notch. This allows the loading rod to move forward as urged by the loading coil spring. The loading rod activates the projectile loading mechanism and the metering device.

(22) In a final variant of the invention, a pistol grip and a forearm of the support stock have flattened lower surfaces. The flattened surfaces permit the bug killing gun to be balanced in an upright position for adding the particulate projectiles to the projectile storage magazine.

An appreciation of the other aims and objectives of the present invention and an understanding of it may be achieved by referring to the accompanying drawings and the detailed description of a preferred embodiment.

DESCRIPTION OF THE DRAWINGS

FIG. 3 is a side elevational cross-section of the FIG. 1 embodiment illustrating the projectile loading mechanism in the firing position;

FIG. 3C is a cross-sectional detailed view of the projectile storage magazine and projectile loading mechanism in the firing position taken along the line 3C-3C;

FIG. 3D is a cross-sectional detailed view of the projectile storage magazine and projectile loading mechanism in the projectile loading position taken along the line 3C-3C;

DETAILED DESCRIPTION OF THE PREFERRED EMBODIMENT (1) FIGS. 1-11 illustrate a bug killing gun 10 providing the desired features that may be constructed from the following components. As illustrated in FIGS. 10 and 11, a compressed gas source 14 is provided. A chamber 18 is provided. The chamber 18 is fluidly connected to the compressed gas source 14. A barrel 22 is provided. The barrel 22 is located at a distal end 26 of the chamber 18. As illustrated in FIGS. 5 and 6, a compressed gas release mechanism 30 is provided. The release mechanism 30 is connected to the compressed gas source 14. As illustrated in FIGS. 1-4, 10 and 11, a projectile storage magazine 34 is provided. The magazine 34 stores particulate projectiles 38 and is located adjacent the chamber 18. A projectile loading mechanism 42 is provided. The loading mechanism 42 moves the particulate projectiles 38 into the chamber 18 from the magazine 34. A cocking mechanism 46 is mechanically connected to the compressed gas source 14, the compressed gas release mechanism 30, and the projectile loading mechanism 42. A stock 50 is provided. The stock 50 houses and supports the compressed gas source 14, the compressed gas release mechanism 30, the barrel 22, the chamber 18, the projectile storage magazine 34, the cocking mechanism 46 and the projectile loading mechanism 42. When the gun 10 is cocked by the cocking mechanism 46, the projectile loading mechanism 42 gathers a predetermined quantity of the particulate projectiles 38 and positions the projectiles 38 in the chamber 18. When the compressed gas release mechanism 30 is activated the projectiles 38 are ejected from the chamber 18 into the barrel 22 and expelled from the gun 10.

Figure 2:
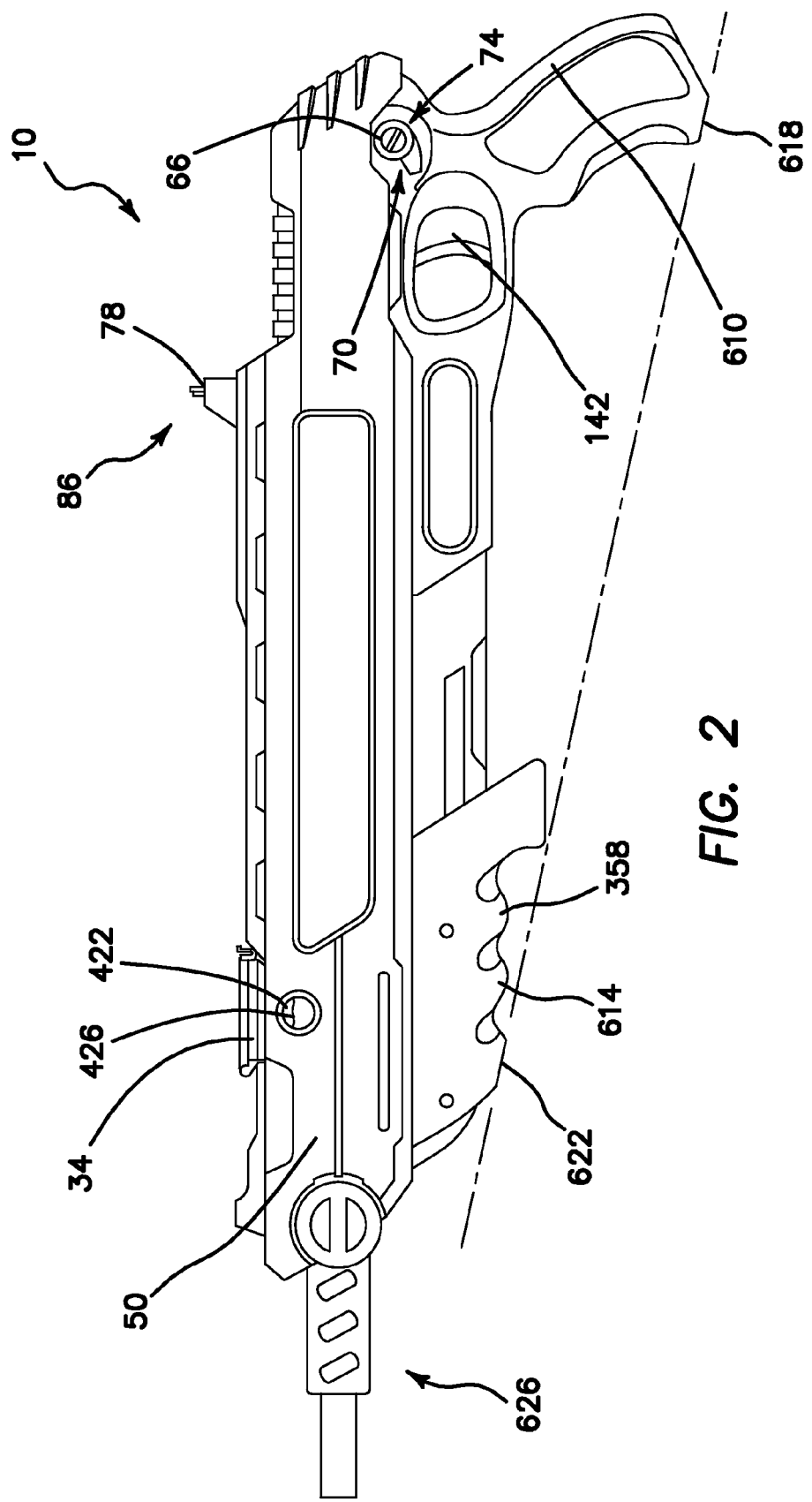
FIG. 2 is a side elevation of the FIG. 1 embodiment illustrating the flattened lower surfaces of the pistol grip and forearm and the external safety.
Figure 7:
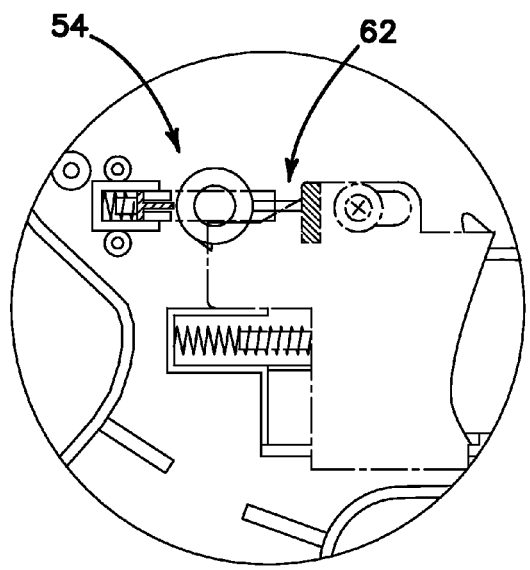
FIG. 7 is a side cross-sectional view of the manual safety in the safe position illustrating the blocking of movement of the trigger.
Figure 8:
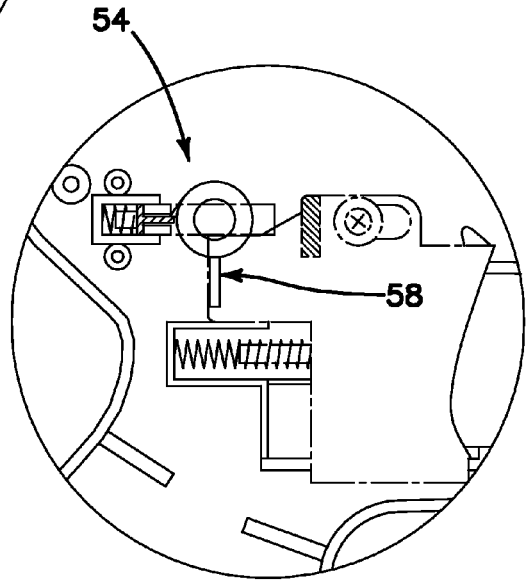
FIG. 8 is a side cross-sectional view of the manual safety in the fire position illustrating the unblocking of movement of the trigger prior to firing.
Figure 9:
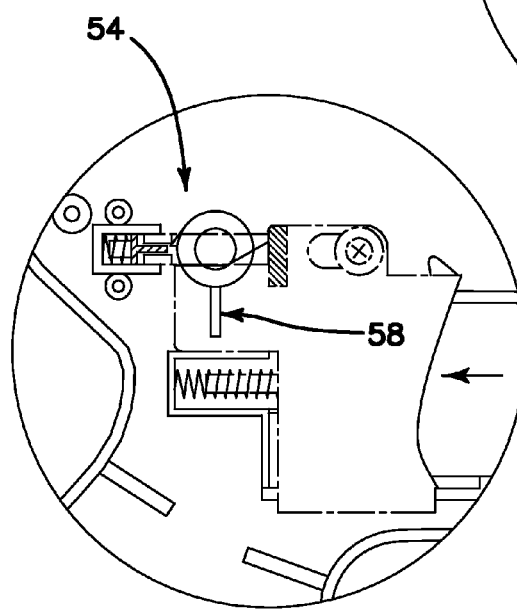
FIG. 9 is a side cross-sectional view of the manual safety in the fire position illustrating rearward movement of the trigger during firing.

(2) In a variant of the invention, as illustrated in FIGS. 7-9, the bug killing gun 10 further includes a safety mechanism 54. The safety mechanism 54 is moved from a firing permitting position 58 to a firing preventing position 62 by the gun cocking action. The firing preventing position 62 prevents activation of the compressed gas release mechanism 30 and is indicated to a user by automatic movement of a primary external safety lever 66 to a first, safe position 70. The firing permitting position 58 permits activation of the compressed gas release mechanism 30 and is indicated to the user by manual movement by the user of the external safety lever 66 to a second, firing position 74, as illustrated in FIG. 2.

(3) In another variant, as illustrated in FIGS. 1, 2, 3A, 5 and 6, a secondary safety indicator 78 is provided. The secondary safety indicator 78 is moved from a hidden position 82 to a visible position 86 by the gun cocking action and is moved to the hidden position 82 by activation of the compressed gas release mechanism 30.

Figure 10:
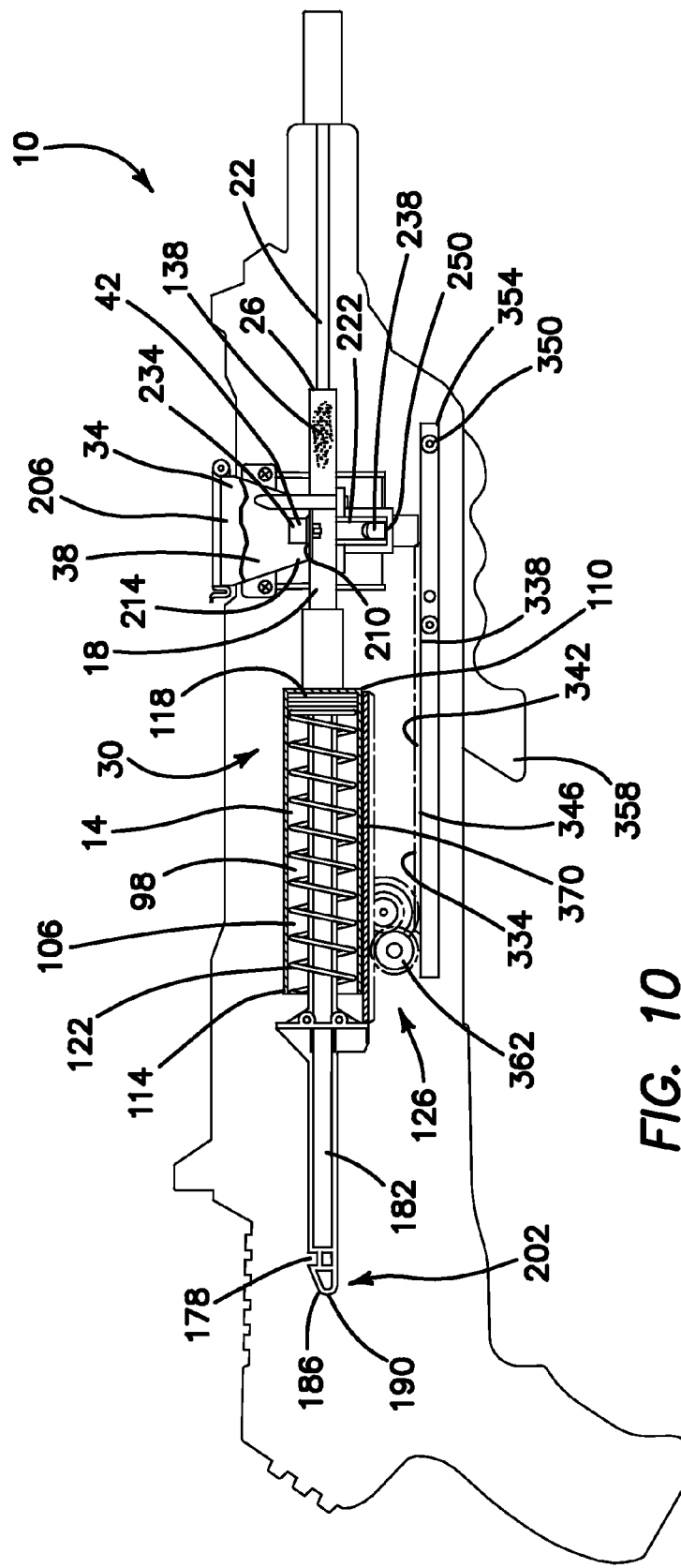
FIG. 10 is a side cross-sectional view of the FIG. 1 embodiment illustrating the spring-activated compressed gas chamber as the bug gun is firing.
Figure 11:
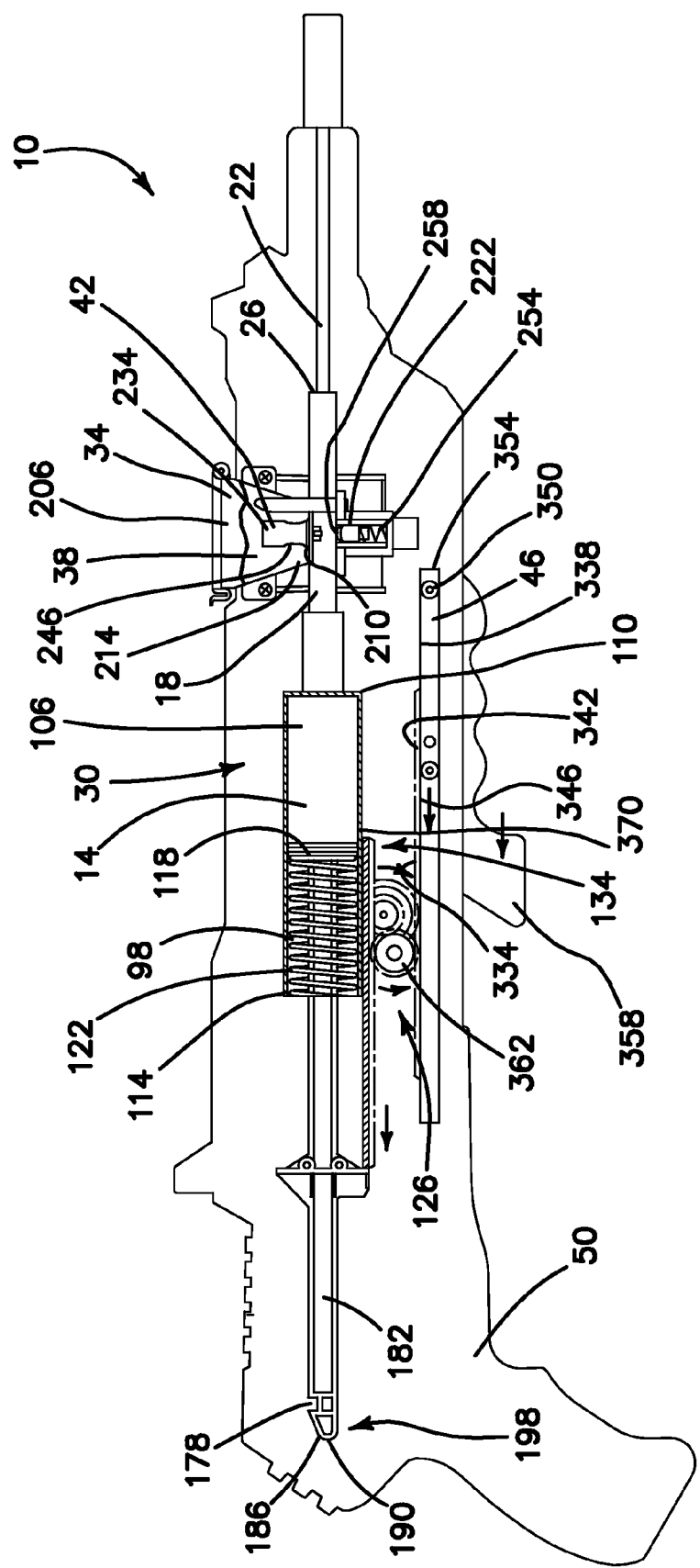
FIG. 11 is a side cross-sectional view of the FIG. 1 embodiment illustrating the spring-activated compressed gas chamber with the bug gun in cocked position.
Figure 12:
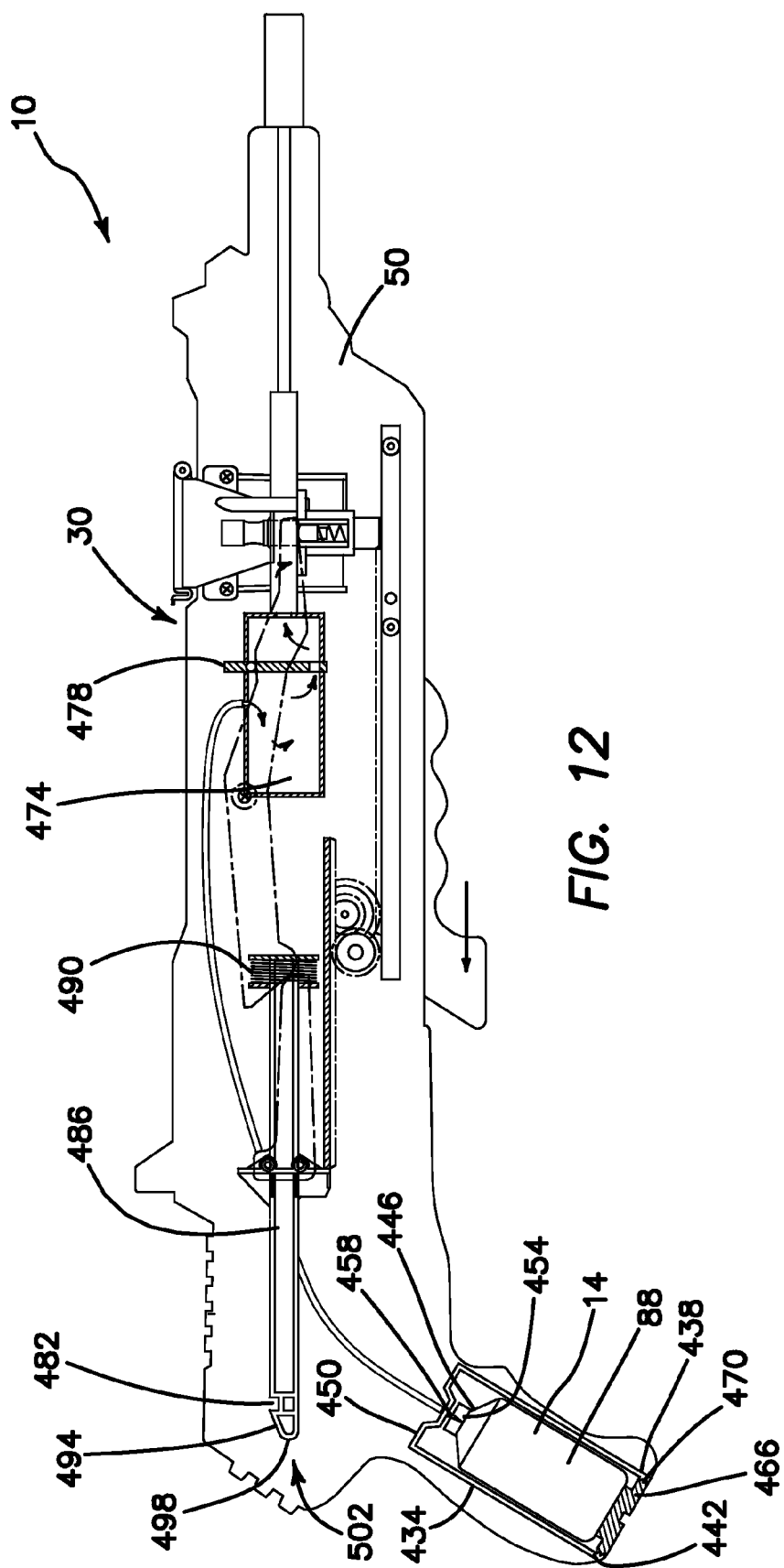
FIG. 12 is a side cross-sectional view of a $CO_2$ powered embodiment of the bug gun illustrating the metering device and latching mechanism in the cocked position.
Figure 13:
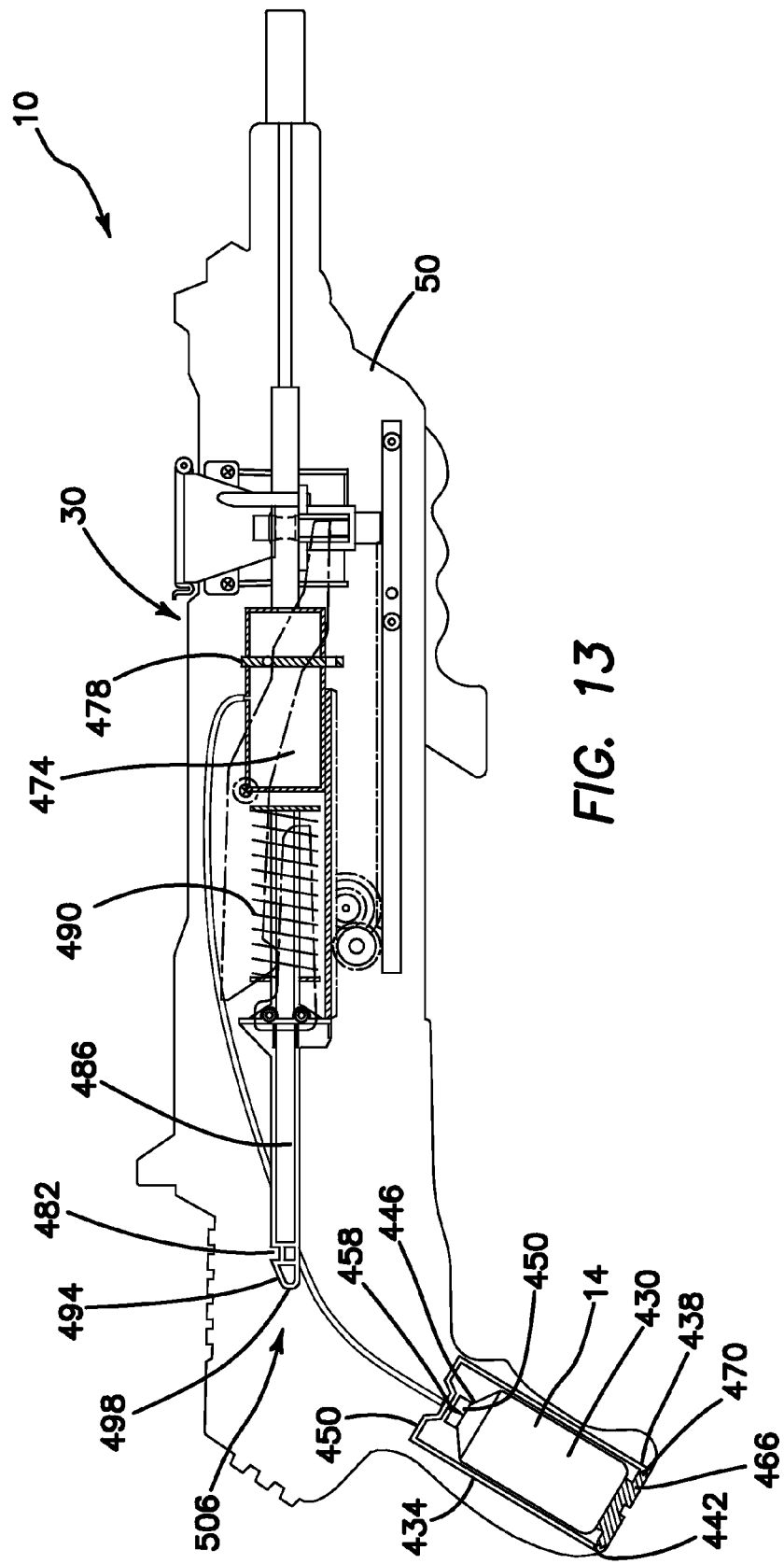
FIG. 13 is a side cross-sectional view of the FIG. 12 embodiment of bug gun illustrating the metering device and latching mechanism in the fired position.
Figure 14:
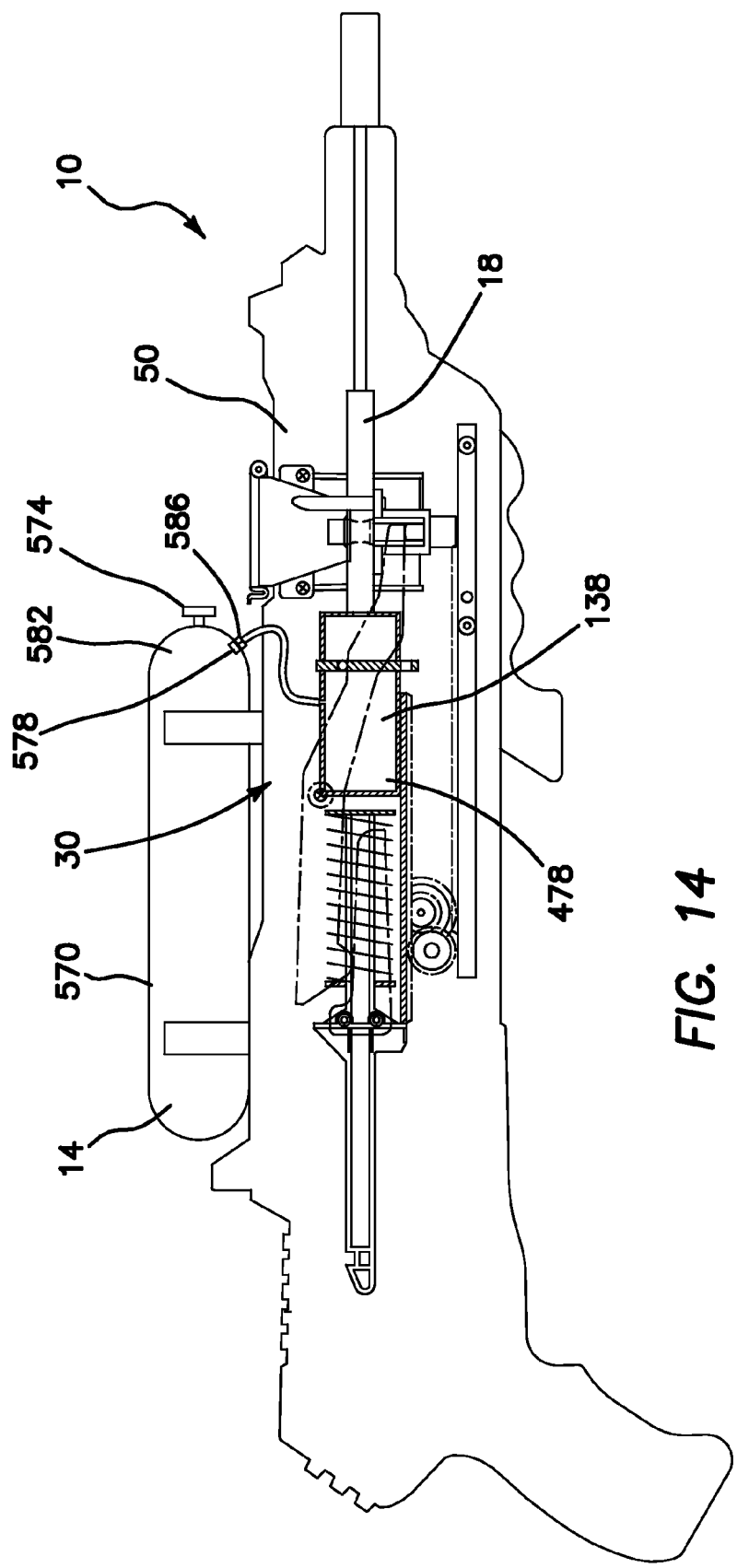
FIG. 14 is a side cross-sectional view of a refillable air cylinder powered embodiment of the bug gun illustrating attachment of the cylinder and connection to the metering device.
Figure 15:
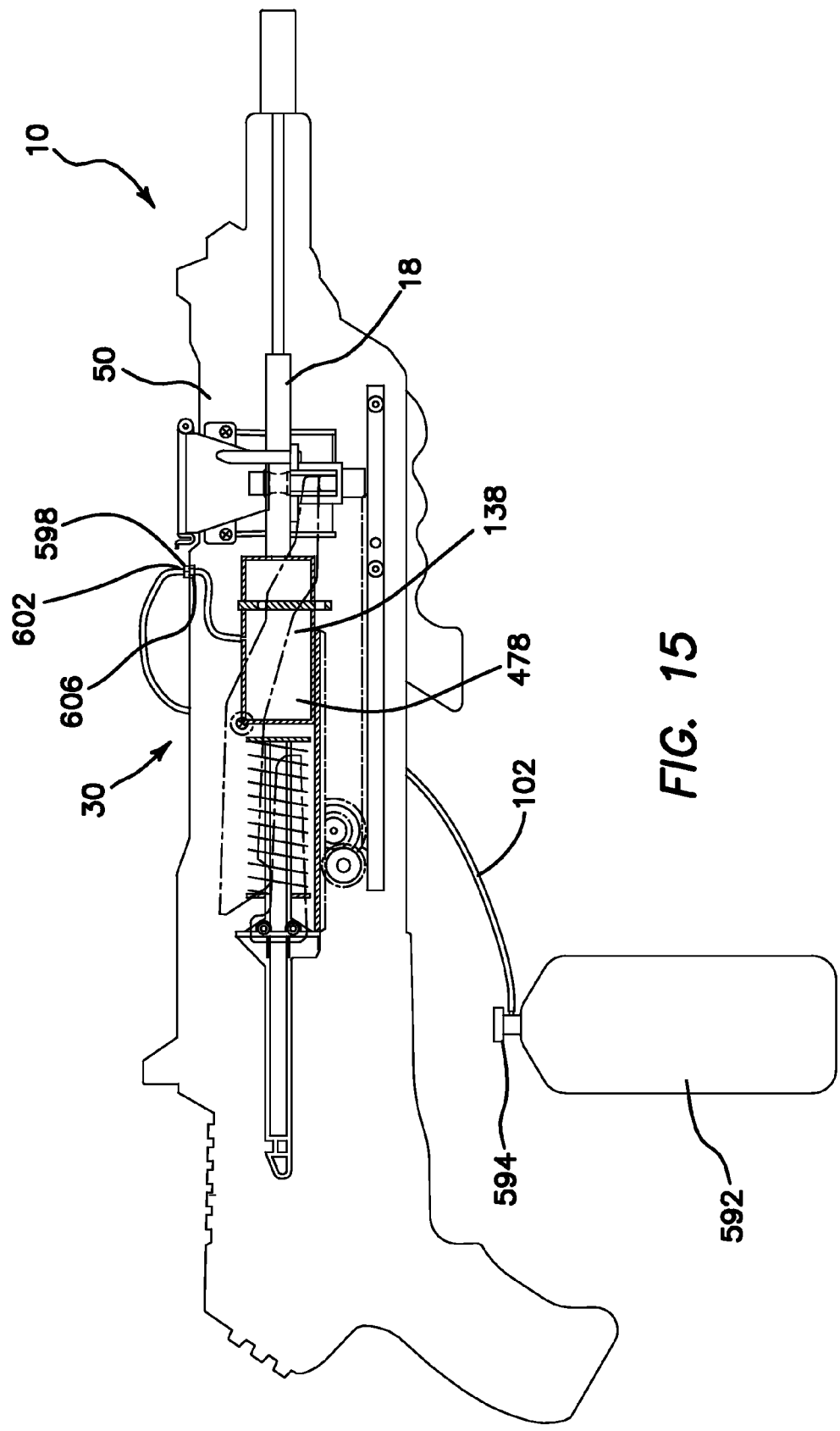
FIG. 15 is a side cross-sectional view of an external compressed gas line powered embodiment of the bug gun illustrating attachment of the gas line and connection to the metering device.
Figure 16:
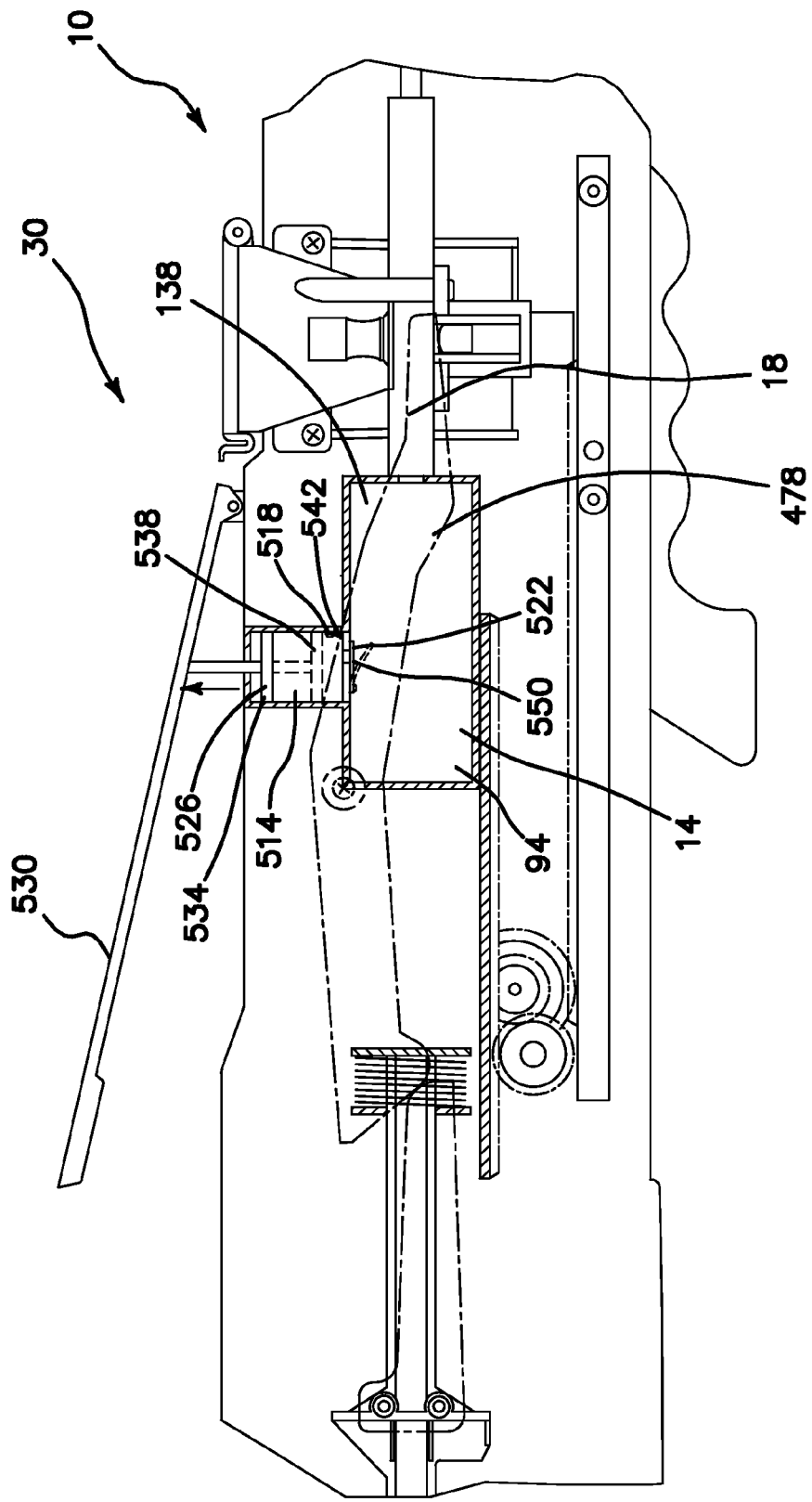
FIG. 16 is a side cross-sectional view of a pneumatically pump powered embodiment of the bug gun illustrating the pumping mechanism and valving connecting to the metering device.

(4) In still another variant, the compressed gas source 14 is selected from the group that includes a prefilled $CO_2$ cartridge 88 as illustrated in FIGS. 12 and 13, a refillable compressed gas cylinder 90 as illustrated in FIG. 14, a pneumatically pumped air reservoir 94 as illustrated in FIG. 16, a spring-activated compressed gas chamber 98, as illustrated in FIGS. 10 and 11, and an external compressed gas line 102 as illustrated in FIG. 15.

(5) In yet another variant, as illustrated in FIGS. 10 and 11, the spring-activated compressed gas chamber 98 further includes a cylinder 106. The cylinder 106 has a front end 110 and a rear end 114 and is fluidly connected to the chamber 18 at the front end 110. A piston 118 is provided. The piston 118 fits sealably in the cylinder 106 and is located within it. A tension spring 122 is provided. The tension spring 122 urges the piston 118 toward the front end 110. A spring tensioning mechanism 126 is provided. The tensioning mechanism 126 urges the piston 118 towards the rear end 114 and stretches the tension spring 122. A latching mechanism 130 is provided. The latching mechanism 130 releasably retains the piston 118 adjacent the rear end 114 and retains the tension spring 122 in a stretched state 134. A user performs the gun cocking action, the spring tensioning mechanism 126 is operated, the piston 118 is urged toward the rear end 114 of the cylinder 106, the spring 122 is stretched and the spring 122 and the piston 118 are retained by the latching mechanism 130 until released, allowing the piston 118 to move rapidly toward the front end 110 of the cylinder 106. This provides a burst of compressed gas 138 in the cylinder 106 and to the connected chamber 18.

Figure 5:
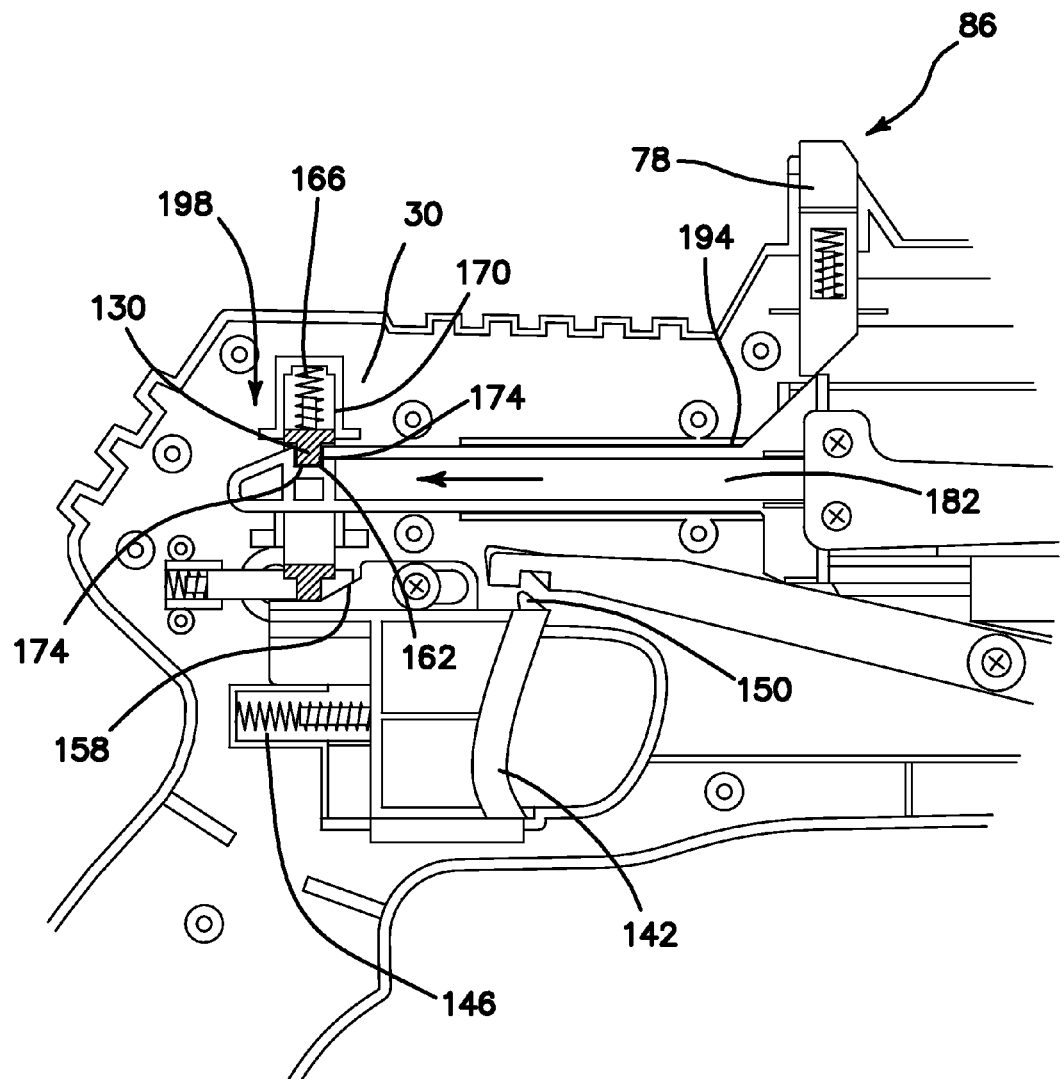
FIG. 5 is a partial side elevational cross-section of the FIG. 1 embodiment further illustrating details of the trigger and latching mechanism in the cocked position and illustrating the sight/firing ready indicator in the elevated position.
Figure 6:
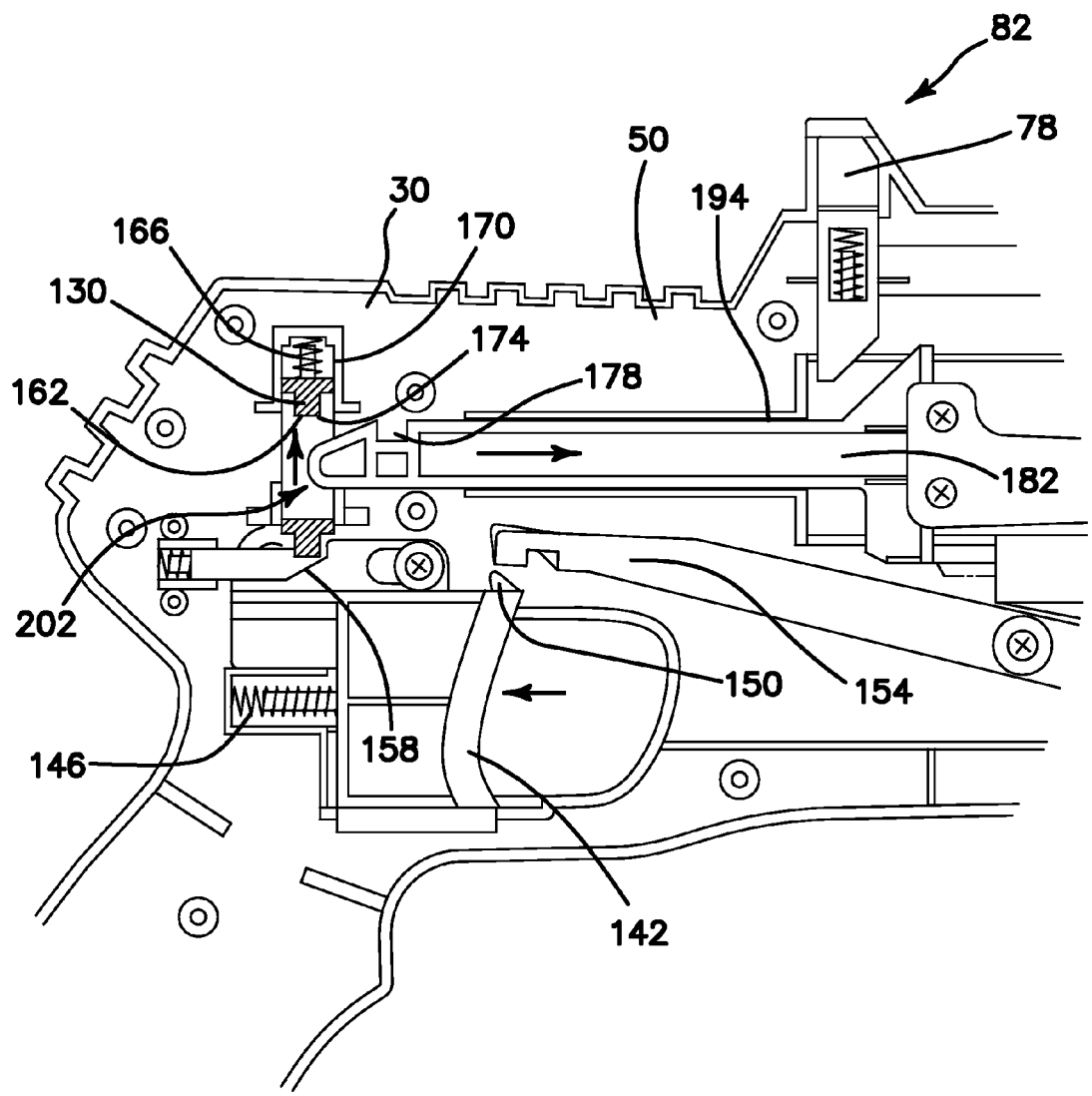
FIG. 6 is a partial side elevational cross-section of the FIG. 1 embodiment further illustrating details of the trigger and latching mechanism in the cocked position and illustrating the sight/firing ready indicator in the lowered position.

(6) In a further variant, as illustrated in FIGS. 5 and 6, the compressed gas release mechanism 30 further includes a trigger 142. The trigger 142 is urged forward by a trigger return spring 146. The trigger 142 has an upper notch 150. The upper notch 150 engages an internal safety pivot 154. The safety pivot 154 prevents release of the latching mechanism 130 unless the cocking action is completed. The trigger 142 has an elevating ramp 158 located rewardly of the upper notch 150. The elevating ramp 158 urges a releasing bracket 162 of the latching mechanism 130 upwardly against a downwardly urging compression spring 166 as the trigger 142 is moved rearwardly. The releasing bracket 162 moves slidably within a vertical channel 170 in the supporting stock 50 and has a downwardly facing rib 174. The rib 174 releasably engages an upwardly facing control notch 178 in a main pole 182 of the latching mechanism 130.

Figure 3A:
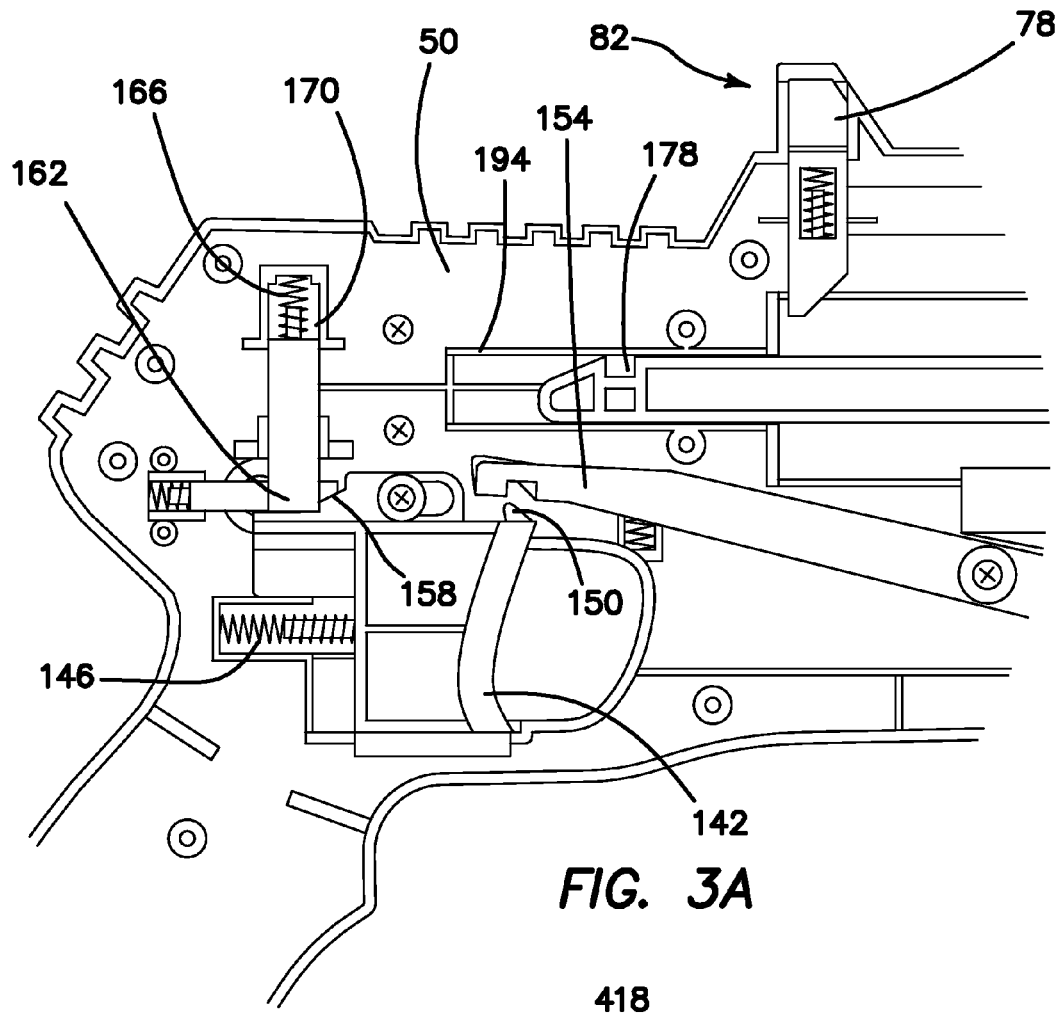
FIG. 3A is a partial side elevational cross-section of the FIG. 1 embodiment illustrating details of the trigger and latching mechanism.

As illustrated in FIGS. 10 and 11, the main pole 182 is attached to the piston 118, has an upwardly angled ramp 186 at a rear end 190, located behind the control notch 178. The ramp 186 guides the rib 174 into the control notch 178. The main pole 182 moves rearwardly in a channel 194 in the supporting stock 50 during the cocking action, as illustrated in FIGS. 3A, 5 and 6. The releasing bracket 162 retains the main pole 182 in a first, cocked position 198 as the rib 174 engages the control notch 178. The bracket 162 releases the main pole 182 to a second, fired position 202 as the trigger 142 is moved rearwardly, elevating the releasing bracket 162 and raising the rib 174 from the control notch 178. This allows the main pole 182 and the piston 118 to move forward as urged by the tension spring 122, pressurizing the cylinder 106.

(7) In still a further variant, the projectile storage magazine 34 further includes an upward facing conical container 206. The container 206 has a circular opening 210 at a lower end 214. The lower end 214 is fitted sealably to an upper end 218 of a vertical circular opening 222 through the chamber 18. The container 206 has a sealing lid 226 removably attached at an upper end 230.

(8) In yet a further variant, as illustrated in FIGS. 3, 3C, 3D, 4, 10 and 11, the projectile loading mechanism 42 further includes a metering rod 234. The metering rod 234 is sized and shaped to fit sealably through the vertical circular opening 222 through the chamber 18 and has an orthogonal activation bar 238 extending from its lower end 242 and a through hole 246 located above the activation bar 238. The through hole 246 is orthogonal to the bar 238 and sized and located to align with the chamber 18 when the bar 238 is positioned against a stopping surface 250. The activation bar 238 is urged upwardly by a return compression spring 254 to rest against a lower end 258 of the vertical circular opening 222 in the chamber 18.

The through hole 246 fills with the particulate projectiles 38 when located above the chamber 18 in the conical container 206 during the cocking action. The activation bar 238 is urged downwardly by a pivotally mounted subordination pole 262 to rest against the stopping surface 250 just after activation of the compressed gas release mechanism 30. This permits the compressed gas 138 to eject the particulate projectiles 38 from the chamber 18 and through the barrel 22.

(9) In another variant of the invention, the projectile loading mechanism 42 further includes a mid-chamber pipe 266. The pipe 266 extends downwardly from a lower end 258 of the magazine 34. A lower portion 282 of the pipe 266 provides a stop 286 for one end 290 of a return compression spring 294. A trajectory guide 298 is provided. The guide 298 is located below the lower end 258 of the magazine 34, has a hollow bore 302 sized to fit slidably about the pipe 266 and has a vertical slot 306 that extends downwardly from the lower end 258 for a first predetermined distance 308. The slot 306 terminates in a stopping surface 250. The trajectory guide 298 is located about the pipe 266 and provides a support platform 310 for attachment of the projectile storage magazine 34. A metering rod 234 is provided. The rod 234 is cylindrical in shape and is sized to fit slidably within the pipe 266 and has an orthogonal activation bar 238 extending from its lower end 242. The metering rod 234 has a through hole 246 located above the activation bar 238. The through hole 246 is orthogonal to the bar 238 and sized and located to align with the chamber 18 when the bar 238 is positioned against the stopping surface 250. A return compression spring 254 urges the metering rod 234 upwardly to rest against a lower end 258 of the vertical circular opening 222 in the chamber 18. A subordination pole 262 is provided. The pole 262 has a first end 314 and a second end 318 and is pivotally mounted to a cover 322 for the compressed gas source 14. The first end 314 of the subordination pole 262 bears against an upper surface 326 of the activation bar 238. The second end 318 of the subordination pole 262 is urged upwardly by a cam 330 upon activation of the gas release mechanism 30. Upward movement of the second end 318 of the subordination pole 262 moves the activation bar 238 downwardly, compresses the return compression spring 254 and aligns the through hole 246 of the metering rod 234 with the chamber 18. This permits the compressed gas 138 to drive the particulate projectiles 38 out of the chamber 18 and through the barrel 22. Downward movement of the second end 318 of the subordination pole 262 permits the activation bar 238 to move upwardly as urged by the return compression spring 254. This allows the particulate projectiles 38 to fill the through hole 246 of the metering rod 234 as it rises in the projectile storage magazine 34 surrounded by the particulate projectiles 38.

(10) In still another variant, as illustrated in FIGS. 1, 2, 4, 10 and 11, the spring compression mechanism 126 further includes a primary gear rack 334. The gear rack 334 is slidably located in a channel 338 in the supporting stock 50, has gear teeth 342 located upon an upper surface 346 and has mounting fixtures 350 adjacent a forward end 354 for attachment of a slide handle 358. A reduction gear drive 362 is provided. The gear drive 362 is mounted to an outer cover 366 of the cylinder 106. A secondary gear rack 370 is provided. The secondary rack 370 is attached indirectly to the piston 118 and is located slidably in a slot (not shown) in the outer cover 366 above the reduction gear drive 362. The primary gear rack 334 engages the reduction gear drive 362 and the reduction gear drive 362 engages the secondary gear rack 370. Rearward movement of the slide handle 358 moves the primary gear rack rearward 334, rotates the reduction gear drive 362, moves the secondary gear rack 370 rearward and moves the piston 118 rearward, compressing the compression spring 122.

Figure 3B:
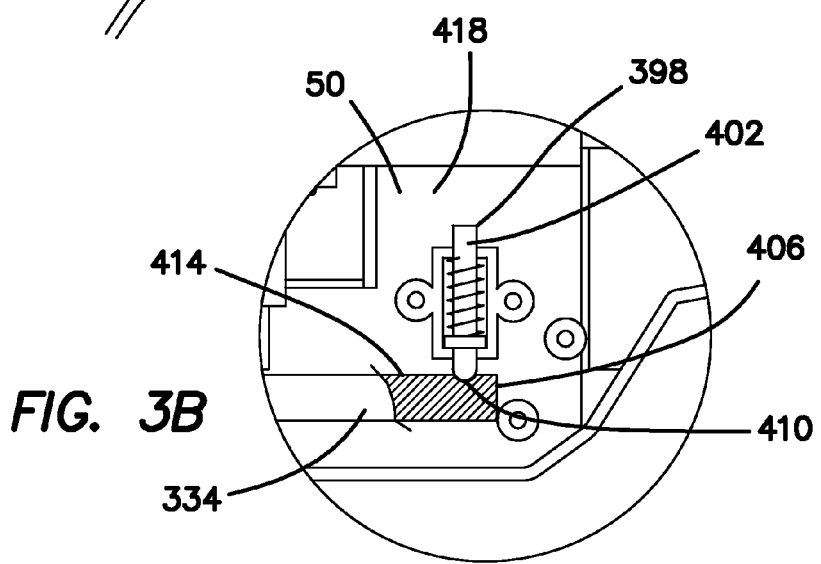
FIG. 3B is a partial side elevational cross-section of the FIG. 1 embodiment illustrating details of the auditory indicator for completed forward movement of the primary gear rack.
Figure 4:
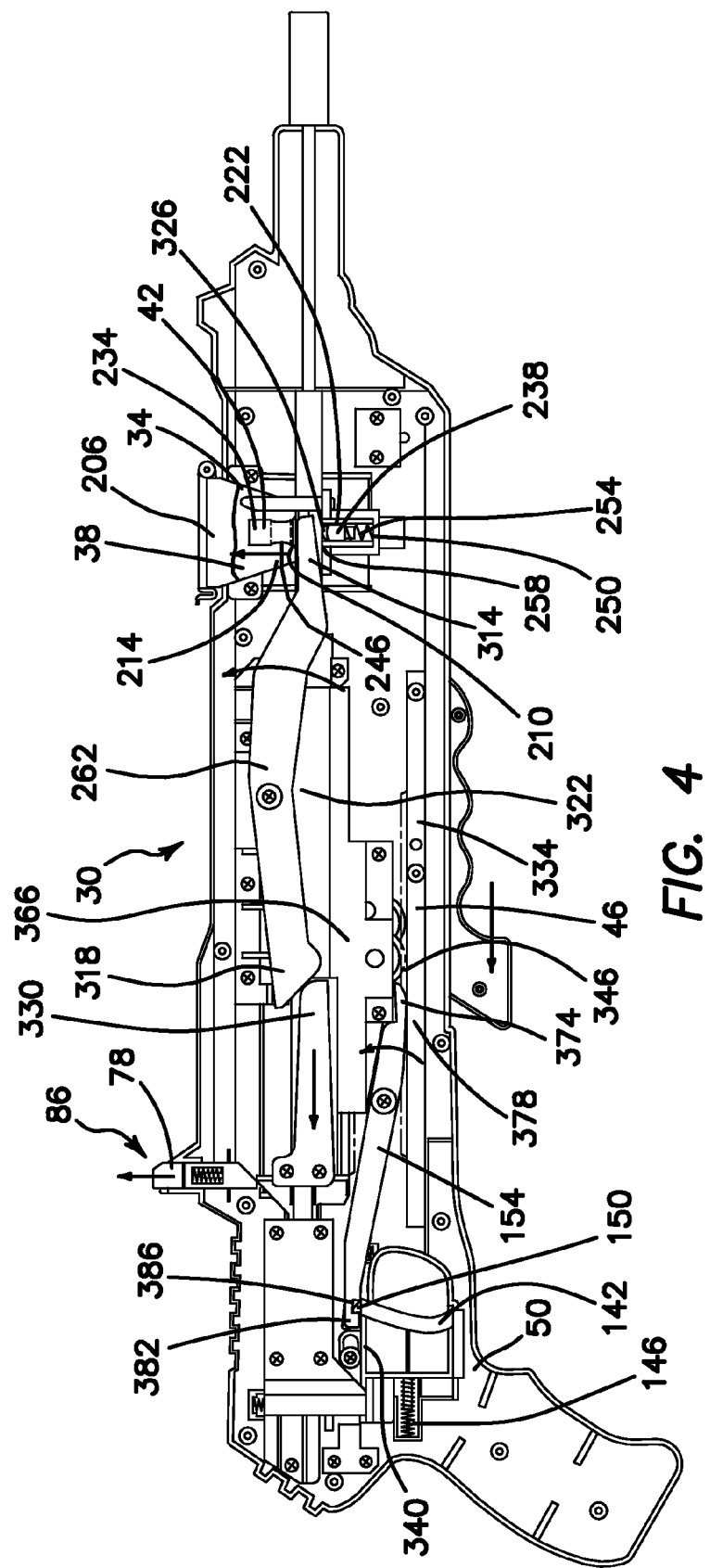
FIG. 4 is a side elevational cross-section of the FIG. 1 embodiment illustrating the projectile loading mechanism in the loading position.

(11) In yet another variant, as illustrated in FIGS. 3 and 4, the upper surface 346 of the primary gear rack 334 maintains a first end 374 of an internal safety pivot 154 in an elevated position 378 during rearward movement. This causes a second end 382 of the pivot 154, which has a downward facing notch 386, to engage an upper notch 150 at an upper end 390 of a trigger 142 of the compressed gas release mechanism 30, thereby preventing activation of the mechanism 30. The upper surface 346 permits downward movement of the internal safety pivot 154, as urged by a coil spring 394, upon completion of forward movement of the primary gear rack 334. The downward movement permits release of the downward facing notch 386 from the trigger 142 and permits activation of the gas release mechanism 30.

(12) In a further variant, as illustrated in FIG. 3B, completion of forward movement of the primary gear rack 334 is indicated to a user by an auditory indicator 398. The indicator 398 includes a spring-driven pin 402 and a receiving detent 406. The detent 406 is located at a distal end 410 of a side surface 414 of the primary gear rack 334 and the spring-driven pin 402 is located on an interior surface 418 of the support stock 50 adjacent the primary gear rack 334. The spring-driven pin 402 enters the detent 406 upon completion of forward movement of the primary gear rack 334 providing an auditory signal to the user.

Figure 1:
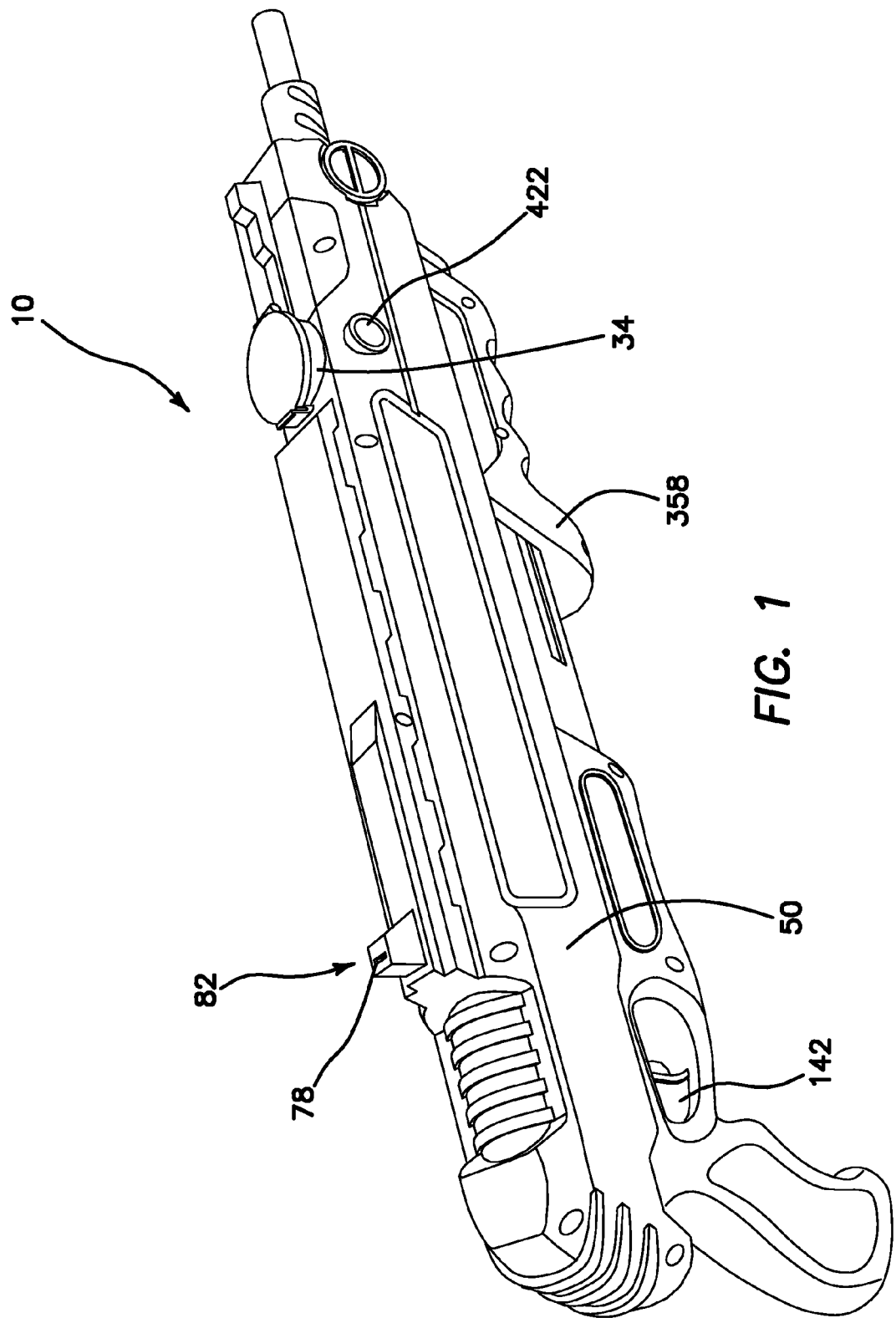
FIG. 1 is a perspective view of the preferred embodiment of the invention including an illustration of the magazine and sightglass.

(13) In still a further variant, as illustrated in FIGS. 1 and 2, the support stock 50 further includes a sight glass 422. The sight glass 422 is positioned adjacent the magazine 34 and permits a view of a level 426 of the particulate projectiles 38 contained in the magazine 34.

(14) In yet a further variant, as illustrated in FIGS. 12 and 13, the gun 10 uses a prefilled $CO_2$ cartridge 88 as a compressed gas source 14 and the gun 10 further includes a cylindrical cartridge chamber 434. The cartridge chamber 434 is sized and shaped to enclose the $CO_2$ cartridge 88 and has a sealable opening 438 at a first end 442 for introduction of the cartridge 88. A concave seat 446 located at a second end 450 is provided. The seat 446 is sized and shaped to fit sealably about a discharging end 454 of the cartridge 88. A hollow puncturing needle 458 is located within the seat 446 A sealing cap 466 is provided. The cap 466 is removably attached to the cartridge chamber 434 by mating screw threads 470. Tightening of the cap 466 urges the cartridge 88 against the puncturing needle 458. A pressure vessel 474 is provided. The pressure vessel 474 is fluidly connected to a metering device 478. The metering device 478 permits a predetermined charge of compressed gas 138 to enter the chamber 18 upon activation of the compressed gas release mechanism 30.

(15) In still a further variant, as illustrated in FIGS. 3A, 5, 6, 12 and 13, the compressed gas release mechanism 30 further includes a trigger 142. The trigger 142 is urged forward by a trigger return spring 146. The trigger has an upper notch 150. The upper notch 150 engages an internal safety pivot 154. The safety pivot 154 prevents activation of the compressed gas release mechanism 30 unless the cocking action is completed. The trigger 142 has an elevating ramp 158 located rewardly of the upper notch 150. The elevating ramp 158 urges a releasing bracket 162 of the latching mechanism 130 upwardly against a downwardly urging compression spring 166 as the trigger 142 is moved rearwardly. The releasing bracket 162 moves slidably within a vertical channel 170 in the supporting stock 50 and has a downwardly facing rib 174. The rib 174 releasably engages an upwardly facing control notch 482 in a loading rod 486. The loading rod 486 is urged forward by a loading coil spring 490, has an upwardly angled ramp 494 at a rear end 498, located behind the control notch 482. The ramp 494 guides the rib 174 into the control notch 482.

The loading rod 486 moves rearwardly in a channel (not shown) in the supporting stock 50 during the cocking action. The releasing bracket 162 retains the loading rod 486 in a first, cocked position 502 as the rib 174 engages the control notch

482. The releasing bracket 162 releases the loading rod 486 to a second, fired position 506 as the trigger 142 is moved rearwardly, elevating the releasing bracket 162 and raising the rib 174 from the control notch 482. This allows the loading rod 486 to move forward as urged by the loading coil spring 490. The loading rod 486 activates the projectile loading mechanism 42 and the metering device 478.

(16) In another variant of the invention, as illustrated in FIG. 16, the gun 10 uses a pneumatically pumped air reservoir 94 as a compressed gas source 14 and the gun 10 further includes a gas cylinder 514. The cylinder 514 has an inlet valve 518 and an outlet valve 522. A piston 526 is provided. The piston 526 fits sealably within the cylinder 514. A pumping mechanism 530 is provided. The pumping mechanism 530 is mechanically linked to the piston 526 and moves the piston 526 from an extended position 534 to a compressed position 538 within the cylinder 514. The inlet valve 518 is in an open position 542 as the piston 526 moves from the compressed position 538 to the extended position 534 and is in a closed position (not shown) as the piston 526 moves from the extended position 534 to the compressed position 538. The outlet valve 522 is in a closed position 550 as the piston moves 526 from the compressed position 538 to the extended position 534 and is in an open position (not shown) as the piston 526 moves from the extended position 534 to the compressed position 538.

The air reservoir 94 is fluidly connected to the outlet valve 522 and said chamber 18. The projectile loading mechanism 42 permits a predetermined charge of compressed gas 138 to enter the chamber 18 upon activation of the compressed gas release mechanism 30. Repeated movement of the piston 526 by the pumping mechanism 530 from the extended position 534 to the compressed position 538 within the cylinder 514 will increase pressure within the air reservoir 94, permitting the particulate projectiles 38 to be ejected from the chamber 18 with increased force upon release of the pressure by the compressed gas release mechanism 30.

(17) In still another variant, as illustrated in FIGS. 3A, 5, 6, 12 and 13, the compressed gas release mechanism 30 further includes a trigger 142. The trigger 142 is urged forward by a trigger return spring 146. The trigger has an upper notch 150. The upper notch 150 engages an internal safety pivot 154. The safety pivot 154 prevents activation of the compressed gas release mechanism 30 unless the cocking action is completed. The trigger 142 has an elevating ramp 158 located rewardly of the upper notch 150. The elevating ramp 158 urges a releasing bracket 162 of the latching mechanism 130 upwardly against a downwardly urging compression spring 166 as the trigger 142 is moved rearwardly. The releasing bracket 162 moves slidably within a vertical channel 170 in the supporting stock 50 and has a downwardly facing rib 174. The rib 174 releasably engages an upwardly facing control notch 482 in a loading rod 486. The loading rod 486 is urged forward by a loading coil spring 490, has an upwardly angled ramp 494 at a rear end 498, located behind the control notch 482. The ramp 494 guides the rib 174 into the control notch 482.

The loading rod 486 moves rearwardly in a channel 498 in the supporting stock 50 during the cocking action. The releasing bracket 162 retains the loading rod 486 in a first, cocked position 502 as the rib 174 engages the control notch 482. The releasing bracket 162 releases the loading rod 486 to a second, fired position 506 as the trigger 142 is moved rearwardly, elevating the releasing bracket 162 and raising the rib 174 from the control notch 482. This allows the loading rod 486 to move forward as urged by the loading coil spring 490. The loading rod 486 activates the projectile loading mechanism 42.

(18) In yet another variant, as illustrated in FIG. 14, the gun 10 uses a refillable compressed gas cylinder 90 as a compressed gas source 14. The cylinder 90 has a shut off valve 574 and an attachment fitting 578 located adjacent a first end 582. A mating attachment fitting 586 is provided. The mating fitting 586 is mounted to the support stock 50 and is fluidly connected to a metering device 478. The metering device 478 is fluidly connected to the chamber 18 and the metering device 478 permits a predetermined charge of compressed gas 138 to enter the chamber 18 upon activation of the compressed gas release mechanism 30. A charged refillable compressed gas cylinder 90 is attached to the mating attachment fitting 586, the shut off valve 574 is opened and the compressed gas 138 is released by the metering device 478 upon activation of the compressed gas release mechanism 30.

(19) In a further variant, as illustrated in FIGS. 3A, 5, 6, 12 and 13, the compressed gas release mechanism 30 further includes a trigger 142. The trigger 142 is urged forward by a trigger return spring 146. The trigger has an upper notch 150. The upper notch 150 engages an internal safety pivot 154. The safety pivot 154 prevents activation of the compressed gas release mechanism 30 unless the cocking action is completed. The trigger 142 has an elevating ramp 158 located rewardly of the upper notch 150. The elevating ramp 158 urges a releasing bracket 162 of the latching mechanism 130 upwardly against a downwardly urging compression spring 166 as the trigger 142 is moved rearwardly. The releasing bracket 162 moves slidably within a vertical channel 170 in the supporting stock 50 and has a downwardly facing rib 174. The rib 174 releasably engages an upwardly facing control notch 482 in a loading rod 486. The loading rod 486 is urged forward by a loading coil spring 490, has an upwardly angled ramp 494 at a rear end 498, located behind the control notch 482. The ramp 494 guides the rib 174 into the control notch 482.

The loading rod 486 moves rearwardly in a channel 498 in the supporting stock 50 during the cocking action. The releasing bracket 162 retains the loading rod 486 in a first, cocked position 502 as the rib 174 engages the control notch 482. The releasing bracket 162 releases the loading rod 486 to a second, fired position 506 as the trigger 142 is moved rearwardly, elevating the releasing bracket 162 and raising the rib 174 from the control notch 482. This allows the loading rod 486 to move forward as urged by the loading coil spring 490. The loading rod 486 activates the projectile loading mechanism 42 and the metering device 478.

(20) In yet a further variant, as illustrated in FIG. 15, the gun 10 uses an external compressed gas line 102 as a compressed gas source 14. The line 102 is connected to a compressed gas source 592 and has a shut off valve 594 and an attachment fitting 598 located adjacent a first end 602. A mating attachment fitting 606 is provided. The mating fitting 606 is mounted to the support stock 50 and is fluidly connected to a metering device 478. The metering device 478 is fluidly connected to the chamber 18. The metering device 478 permits a predetermined charge of compressed gas 138 to enter the chamber 18 upon activation of the compressed gas release mechanism 30. The external compressed gas line 102 is attached to the mating attachment fitting 606, the shut off valve 594 is opened and the compressed gas 138 is released by the metering device 478 upon activation of the compressed gas release mechanism 30.

(21) In still a further variant, as illustrated in FIGS. 3A, 5, 6, 12 and 13, 9, the compressed gas release mechanism 30 further includes a trigger 142. The trigger 142 is urged forward by a trigger return spring 146. The trigger has an upper notch 150. The upper notch 150 engages an internal safety pivot 154. The safety pivot 154 prevents activation of the compressed gas release mechanism 30 unless the cocking action is completed. The trigger 142 has an elevating ramp 158 located rewardly of the upper notch 150. The elevating ramp 158 urges a releasing bracket 162 of the latching mechanism 130 upwardly against a downwardly urging compression spring 166 as the trigger 142 is moved rearwardly. The releasing bracket 162 moves slidably within a vertical channel 170 in the supporting stock 50 and has a downwardly facing rib 174. The rib 174 releasably engages an upwardly facing control notch 482 in a loading rod 486. The loading rod 486 is urged forward by a loading coil spring 490, has an upwardly angled ramp 494 at a rear end 498, located behind the control notch 482. The ramp 494 guides the rib 174 into the control notch 482.

The loading rod 486 moves rearwardly in a channel 498 in the supporting stock 50 during the cocking action. The releasing bracket 162 retains the loading rod 486 in a first, cocked position 502 as the rib 174 engages the control notch 482. The releasing bracket 162 releases the loading rod 486 to a second, fired position 506 as the trigger 142 is moved rearwardly, elevating the releasing bracket 162 and raising the rib 174 from the control notch 482. This allows the loading rod 486 to move forward as urged by the loading coil spring 490. The loading rod 486 activates the projectile loading mechanism 42 and the metering device 478.

(22) In a final variant of the invention, as illustrated in FIG. 2, a pistol grip 610 and a forearm 614 of the support stock 50 have flattened lower surfaces 618, 622. The flattened surfaces 618, 622 permit the bug killing gun 10 to be balanced in an upright position 626 for adding the particulate projectiles 38 to the projectile storage magazine 34.

The bug killing gun 10 has been described with reference to particular embodiments. Other modifications and enhancements can be made without departing from the spirit and scope of the claims that follow.

The invention claimed is:

1. A bug killing gun, comprising:
a compressed gas source,
a chamber, said chamber fluidly connected to said compressed gas source;
a barrel, said barrel disposed at a distal end of said chamber;
a compressed gas release mechanism, said release mechanism connected to said compressed gas source;
a projectile storage magazine, said magazine storing particulate projectiles and being disposed adjacent said chamber;
a projectile loading mechanism, said loading mechanism moving said particulate projectiles into said chamber from said magazine;
a cocking mechanism mechanically connecting said compressed gas source, said compressed gas release mechanism, and said projectile loading mechanism;
a stock, said stock housing and supporting said compressed gas source, said compressed gas release mechanism, said barrel, said chamber, said projectile storage magazine, said cocking mechanism and said projectile loading mechanism;
wherein, when said gun is cocked by said cocking mechanism, said projectile loading mechanism gathers a predetermined quantity of said particulate projectiles and positions said projectiles in said chamber; and when said compressed gas release mechanism is activated said projectiles are ejected from said chamber into said barrel and expelled from said gun.

2. The bug killing gun, as described in claim 1, further comprising:
a safety mechanism, said safety mechanism being moved from a firing permitting position to a firing preventing position by said gun cocking action;
said firing preventing position preventing activation of said compressed gas release mechanism and being indicated to a user by automatic movement of a primary external safety lever to a first, safe position; and
said firing permitting position permitting activation of said compressed gas release mechanism and being indicated to said user by manual movement by said user of said external safety lever to a second, firing position.

3. The bug killing gun, as described in claim 2, further comprising a secondary safety indicator, said secondary safety indicator being moved from a hidden position to a visible position by said gun cocking action and being moved to said hidden position by activation of said compressed gas release mechanism.

4. The bug killing gun, as described in claim 1, wherein said compressed gas source is selected from the group comprising:
a prefilled $CO_2$ cartridge, a refillable compressed gas cylinder, a pneumatically pumped gas reservoir, a spring-activated compressed gas chamber and an external compressed gas line.

5. The bug killing gun, as described in claim 4, wherein said spring-activated compressed gas chamber further comprises:
a cylinder, said cylinder having a front end and a rear end and being fluidly connected to said chamber at said front end;
a piston, said piston fitting sealably in said cylinder and being disposed therein;
a compression spring, said compression spring urging said piston toward said front end;
a spring compression mechanism, said compression mechanism urging said piston towards said rear end and compressing said compression spring;
a latching mechanism, said latching mechanism releasably retaining said piston adjacent said rear end and retaining said compression spring in a compressed state; and
wherein a user performs said gun cocking action, said spring compression mechanism is operated, said piston is urged toward said rear end of said cylinder, said spring is compressed and said spring and said piston are retained by said latching mechanism until released allowing said piston to move rapidly toward said front end of said cylinder, providing a burst of compressed gas in said cylinder and to said connected chamber.

6. The bug killing gun, as described in claim 5, wherein said compressed gas release mechanism further comprises:
a trigger, said trigger being urged forward by a trigger return spring;
said trigger having an upper notch, said upper notch engaging an internal safety pivot, said safety pivot preventing release of said latching mechanism unless said cocking action is completed;
said trigger having an elevating ramp disposed rewardly of said upper notch, said elevating ramp urging a releasing bracket of said latching mechanism upwardly against a downwardly urging compression spring as said trigger is moved rearwardly;
said releasing bracket moving slidably within a vertical channel in said supporting stock and having a downwardly facing rib, said rib releasably engaging an upwardly facing control notch in a main pole of said latching mechanism;

said main pole being attached to said piston, having an upwardly angled ramp at a rear end, disposed behind said control notch, said ramp guiding said rib into said control notch, said main pole moving rearwardly in a channel in said supporting stock during said cocking action; and said releasing bracket retaining said main pole in a first, cocked position as said rib engages said control notch and releasing said main pole to a second, fired position as said trigger is moved rearwardly elevating said releasing bracket and raising said rib from said control notch, allowing said main pole and said piston to move forward as urged by said compression spring, pressurizing said cylinder.

7. The bug killing gun, as described in claim 5, wherein said spring compression mechanism further comprises:

a primary gear rack, said gear rack being slidably disposed in a channel in said supporting stock, having gear teeth disposed upon an upper surface and having mounting fixtures adjacent a forward end for attachment of a slide handle;

a reduction gear drive, said gear drive mounted to an outer cover of said cylinder;

a secondary gear rack, said secondary rack attached indirectly to said piston and being disposed slidably in a slot in said outer cover above said reduction gear drive;

said primary gear rack engaging said reduction gear drive and said reduction gear drive engaging said secondary gear rack; and wherein rearward movement of said slide handle moves said primary gear rack rearward, rotates said reduction gear drive, moves said secondary gear rack rearward and moves said piston rearward, compressing said compression spring.

8. The bug killing gun, as described in claim 7, wherein:

said upper surface of said primary gear rack maintains a first end of an internal safety pivot in an elevated position during rearward movement, causing a second end of said pivot, said second end having a downward facing notch, to engage an upper notch at an upper end of a trigger of said compressed gas release mechanism, thereby preventing activation of said mechanism; and said upper surface permitting downward movement of said internal safety pivot, as urged by a coil spring, upon completion of forward movement of said primary gear rack, said downward movement permitting release of said downward facing notch from said trigger and permitting activation of said gas release mechanism.

9. The bug killing gun, as described in claim 8, wherein completion of forward movement of said primary gear rack is indicated to a user by an auditory indicator, said indicator comprising:

a spring-driven pin and a receiving detent, said detent disposed at a distal end of a side surface of said primary gear rack and said spring-driven pin disposed on an interior surface of said support stock adjacent said primary gear rack; and wherein said spring-driven pin enters said detent upon completion of forward movement of said primary gear rack providing an auditory signal to said user.

10. The bug killing gun, as described in claim 4, wherein said gun uses a prefilled $CO_2$ cartridge as a compressed gas source, said gun further comprising:

a cylindrical cartridge chamber, said cartridge chamber being sized and shaped to enclose the $CO_2$ cartridge, having a sealable opening at a first end for introduction of said cartridge, a concave seat disposed at a second end, said seat being sized and shaped to fit sealably about a discharging end of said cartridge, a hollow puncturing needle disposed within said seat;

a sealing cap, said cap being removably attached to said cartridge chamber by mating screw threads, tightening of said cap urging said cartridge against said puncturing needle;

a pressure vessel, said pressure vessel being fluidly connected to a metering device; and said metering device permitting a predetermined charge of compressed gas to enter said chamber upon activation of said compressed gas release mechanism.

11. The bug killing gun, as described in claim 10, wherein said compressed gas release mechanism further comprises:

a trigger, said trigger being urged forward by a trigger return spring;

said trigger having an upper notch, said upper notch engaging an internal safety pivot, said safety pivot preventing activation of said compressed gas release mechanism unless said cocking action is completed;

said trigger having an elevating ramp disposed rewardly of said upper notch, said elevating ramp urging a releasing bracket of said latching mechanism upwardly against a downwardly urging compression spring as said trigger is moved rearwardly;

said releasing bracket moving slidably within a vertical channel in said supporting stock and having a downwardly facing rib, said rib releasably engaging an upwardly facing control notch in a loading rod;

said loading rod being urged forward by a loading coil spring, having an upwardly angled ramp at a rear end, disposed behind said control notch, said ramp guiding said rib into said control notch, said loading rod moving rearwardly in a channel in said supporting stock during said cocking action; and said releasing bracket retaining said loading rod in a first, cocked position as said rib engages said control notch and releasing said loading rod to a second, fired position as said trigger is moved rearwardly elevating said releasing bracket and raising said rib from said control notch, allowing said loading rod to move forward as urged by said loading coil spring, said loading rod activating said projectile loading mechanism and said metering device.

12. The bug killing gun, as described in claim 4, wherein said gun uses a pneumatically pumped air reservoir as a compressed gas source, said gun further comprising:

a gas cylinder, said cylinder having an inlet valve and an outlet valve;

a piston, said piston fitting sealably within said cylinder;

a pumping mechanism, said pumping mechanism mechanically linked to said piston, and moving said piston from an extended position to a compressed position within said cylinder;

said inlet valve being in an open position as said piston moves from said compressed position to said extended position and being in a closed position as said piston moves from said extended position to said compressed position;

said outlet valve being in a closed position as said piston moves from said compressed position to said extended position and being in an open position as said piston moves from said extended position to said compressed position;

said air reservoir being fluidly connected to said outlet valve and said chamber;

said projectile loading mechanism permitting a predetermined charge of compressed gas to enter said chamber upon activation of said compressed gas release mechanism; and wherein repeated movement of said piston by said pumping mechanism from said extended position to said compressed position within said cylinder will increase pressure within said air reservoir, permitting said particulate projectiles to be ejected from said chamber with increased force upon release of said pressure by said compressed gas release mechanism.

13. The bug killing gun, as described in claim 12, wherein said compressed gas release mechanism further comprises:

a trigger, said trigger being urged forward by a trigger return spring;

said trigger having an upper notch, said upper notch engaging an internal safety pivot, said safety pivot preventing activation of said compressed gas release mechanism unless said cocking action is completed;

said trigger having an elevating ramp disposed rewardly of said upper notch, said elevating ramp urging a releasing bracket of said latching mechanism upwardly against a downwardly urging compression spring as said trigger is moved rearwardly;

said releasing bracket moving slidably within a vertical channel in said supporting stock and having a downwardly facing rib, said rib releasably engaging an upwardly facing control notch in a loading rod;

said loading rod being urged forward by a loading coil spring, having an upwardly angled ramp at a rear end, disposed behind said control notch, said ramp guiding said rib into said control notch, said loading rod moving rearwardly in a channel in said supporting stock during said cocking action; and said releasing bracket retaining said loading rod in a first, cocked position as said rib engages said control notch and releasing said loading rod to a second, fired position as said trigger is moved rearwardly elevating said releasing bracket and raising said rib from said control notch, allowing said loading rod to move forward as urged by said loading coil spring, said loading rod activating said projectile loading mechanism.

14. The bug killing gun, as described in claim 4, wherein said gun uses a refillable compressed gas cylinder as a compressed gas source, said gun further comprising:

a refillable compressed gas cylinder, said cylinder having a shut off valve and an attachment fitting disposed adjacent a first end;

a mating attachment fitting, said mating fitting mounted to said support stock and being fluidly connected to a metering device;

said metering device being fluidly connected to said chamber and said metering device permitting a predetermined charge of compressed gas to enter said chamber upon activation of said compressed gas release mechanism; and wherein a charged refillable compressed gas cylinder is attached to said mating attachment fitting, said shut off valve is opened and said compressed gas is released by said metering device upon activation of said compressed gas release mechanism.

15. The bug killing gun, as described in claim 14, wherein said compressed gas release mechanism further comprises:

a trigger, said trigger being urged forward by a trigger return spring;

said trigger having an upper notch, said upper notch engaging an internal safety pivot, said safety pivot preventing activation of said compressed gas release mechanism unless said cocking action is completed;

said trigger having an elevating ramp disposed rewardly of said upper notch, said elevating ramp urging a releasing bracket of said latching mechanism upwardly against a downwardly urging compression spring as said trigger is moved rearwardly;

said releasing bracket moving slidably within a vertical channel in said supporting stock and having a downwardly facing rib, said rib releasably engaging an upwardly facing control notch in a loading rod;

said loading rod being urged forward by a loading coil spring, having an upwardly angled ramp at a rear end, disposed behind said control notch, said ramp guiding said rib into said control notch, said loading rod moving rearwardly in a channel in said supporting stock during said cocking action; and said releasing bracket retaining said loading rod in a first, cocked position as said rib engages said control notch and releasing said loading rod to a second, fired position as said trigger is moved rearwardly elevating said releasing bracket and raising said rib from said control notch, allowing said loading rod to move forward as urged by said loading coil spring, said loading rod activating said projectile loading mechanism and said metering device.

16. The bug killing gun, as described in claim 4, wherein said gun uses an external compressed gas line as a compressed gas source, said gun further comprising:

an external compressed gas line, said line being connected to a compressed gas source and having a shut off valve and an attachment fitting disposed adjacent a first end;

a mating attachment fitting, said mating fitting mounted to said support stock and being fluidly connected to a metering device;

said metering device being fluidly connected to said chamber and said metering device permitting a predetermined charge of compressed gas to enter said chamber upon activation of said compressed gas release mechanism; and wherein said external compressed gas line is attached to said mating attachment fitting, said shut off valve is opened and said compressed gas is released by said metering device upon activation of said compressed gas release mechanism.

17. The bug killing gun, as described in claim 16, wherein said compressed gas release mechanism further comprises:

a trigger, said trigger being urged forward by a trigger return spring;

said trigger having an upper notch, said upper notch engaging an internal safety pivot, said safety pivot preventing activation of said compressed gas release mechanism unless said cocking action is completed;

said trigger having an elevating ramp disposed rewardly of said upper notch, said elevating ramp urging a releasing bracket of said latching mechanism upwardly against a downwardly urging compression spring as said trigger is moved rearwardly;

said releasing bracket moving slidably within a vertical channel in said supporting stock and having a downwardly facing rib, said rib releasably engaging an upwardly facing control notch in a loading rod;

said loading rod being urged forward by a loading coil spring, having an upwardly angled ramp at a rear end, disposed behind said control notch, said ramp guiding said rib into said control notch, said loading rod moving rearwardly in a channel in said supporting stock during said cocking action; and said releasing bracket retaining said loading rod in a first, cocked position as said rib engages said control notch and releasing said loading rod to a second, fired position as said trigger is moved rearwardly elevating said releasing bracket and raising said rib from said control notch, allowing said loading rod to move forward as urged by said loading coil spring, said loading rod activating said projectile loading mechanism and said metering device.

18. The bug killing gun, as described in claim 1, wherein said projectile storage magazine further comprises:
    an upward facing conical container, said container having a circular opening at a lower end;
    said lower end fitted sealably to an upper end of a vertical circular opening through said chamber; and
    said container having a sealing lid removably attached at an upper end.

19. The bug killing gun, as described in claim 18, wherein said projectile loading mechanism further comprises:
    a metering rod, said metering rod being sized and shaped to fit sealably through said vertical circular opening through said chamber and having an orthogonal activation bar extending from a lower end thereof and a through hole disposed above said activation bar, said through hole being orthogonal to said bar and sized and disposed to align with said chamber when said bar is positioned against a stopping surface;
    said activation bar being urged upwardly by a return compression spring to rest against said lower end of said vertical circular opening in said chamber;
    said through hole filling with said particulate projectiles when disposed above said chamber in said conical container during said cocking action; and
    said activation bar being urged downwardly by a pivotally mounted subordination pole to rest against said stopping surface just after activation of said compressed gas release mechanism, permitting said compressed gas to eject said particulate projectiles from said chamber and through said barrel.

20. The bug killing gun, as described in claim 18, wherein said projectile loading mechanism further comprises:
    a mid-chamber pipe, said pipe extending downwardly from a lower end of said magazine;
    a lower portion of said pipe providing a stop for one end of a return compression spring;
    a trajectory guide, said guide disposed below said magazine, having a hollow bore sized to fit slidably about said pipe and having a vertical slot extending downwardly from said lower end for a first predetermined distance and terminating in a stopping surface;
    said trajectory guide being disposed about said pipe and providing a support platform for attachment of said projectile storage magazine;
    a metering rod, said rod being cylindrical in shape and being sized to fit slidably within said pipe and having an orthogonal activation bar extending from a lower end thereof and a through hole disposed above said activation bar, said through hole being orthogonal to said bar and sized and disposed to align with said chamber when said bar is positioned against said stopping surface;
    said return compression spring urging said metering rod upwardly to rest against said lower end of said vertical circular opening in said chamber; and
    a subordination pole, said pole having a first end and a second end, being pivotally mounted to a cover for said compressed gas source, said first end bearing against an upper surface of said activation bar, said second end being urged upwardly by a cam upon activation of said gas release mechanism;
    wherein upward movement of said second end of said subordination pole moves said activation bar downwardly, compressing said return compression spring and aligning said through hole of said metering rod with said chamber, permitting said compressed gas to drive said particulate projectiles out of said chamber and through said barrel;
    wherein downward movement of said second end of said subordination pole permits said activation bar to move upwardly as urged by said return compression spring, said particulate projectiles filling said through hole of said metering rod as it rises in said projectile storage magazine surrounded by said particulate projectiles.

21. The bug killing gun, as described in claim 1, wherein said support stock further comprises a sight glass, said sight glass positioned adjacent said magazine and permitting a view of a level of said particulate projectiles contained therein.

22. The bug killing gun, as described in claim 1, wherein a pistol grip and a forearm of said support stock have flattened lower surfaces, said flattened surfaces permitting said bug killing gun to be balanced in an upright position for adding said particulate projectiles to said projectile storage magazine.

\* \* \* \* \*